(12) United States Patent
Telefus et al.

(10) Patent No.: US 6,275,018 B1
(45) Date of Patent: Aug. 14, 2001

(54) SWITCHING POWER CONVERTER WITH GATED OSCILLATOR CONTROLLER

(75) Inventors: Mark D. Telefus, Orinda, CA (US); Arthur J. Collmeyer, Incline Village, NV (US); Dickson T. Wong, Burlingame, CA (US); David B. Manner, Traverse City, MI (US)

(73) Assignee: Iwatt, Campbell, CA (US)

( * ) Notice: Subject to any disclaimer, the term of this patent is extended or adjusted under 35 U.S.C. 154(b) by 0 days.

(21) Appl. No.: 09/585,928

(22) Filed: Jun. 2, 2000

(51) Int. Cl.[7] ....................................................... G05F 1/56
(52) U.S. Cl. ............................ 323/282; 323/222; 363/16
(58) Field of Search ................................... 323/222, 282, 323/351; 363/16

(56) References Cited

U.S. PATENT DOCUMENTS

| | | | |
|---|---|---|---|
| 5,028,861 | * 7/1991 | Pace et al. | 323/222 |
| 5,146,398 | * 9/1992 | Vila-Masot et al. | 323/222 |
| 5,565,761 | * 10/1996 | Hwang | 323/282 |
| 5,629,841 | 5/1997 | Attwood | 363/21 |
| 5,747,977 | * 5/1998 | Hwang | 323/222 |
| 5,764,039 | * 6/1998 | Choi et al. | 323/222 |
| 5,804,950 | * 9/1998 | Hwang | 323/282 |
| 5,822,200 | 10/1998 | Stasz | 363/21 |
| 5,831,418 | * 11/1998 | Kitagawa | 323/222 |
| 5,886,885 | * 3/1999 | Fujie | 323/222 |
| 5,949,229 | * 9/1999 | Choi et al. | 323/222 |
| 6,087,816 | * 7/2000 | Volk | 323/282 |
| 6,115,274 | * 9/2000 | Mao | 323/222 |

OTHER PUBLICATIONS

Micrel, Inc., Product Brochure, MIC 2141 Micropower Boost Converter, Preliminary Information, Jun. 2000.
TNY253/254/255, TinySwitch™Family, Energy Efficient, Low Power Off–line Switchers, Power Integrations, Inc., Feb. 1999, pp. 1–16.

* cited by examiner

Primary Examiner—Jeffrey Sterrett
(74) Attorney, Agent, or Firm—Lyon & Lyon LLP

(57) ABSTRACT

A switching power converter for conversion of power between a source and a load includes a power switch, a free running oscillator for producing a drive signal to cycle the power switch ON and OFF, wherein the power switch, when coupled to the source and cycled ON and OFF, defines a pulse of power at the load, and a controller which regulates an output voltage at the load by varying the number of pulses of power occurring at the load over time.

18 Claims, 18 Drawing Sheets

POWER CONVERTER W/

POWER CONVERTER WITH DUTY CYCLE MAX/MIN CONTROLLER

CONTROL STRATEGIES

DUTY CYCLE CONTROLLER W/ BUCK CONVERTER

SWITCHING POWER CONVERTER WITH GATED OSCILLATOR CONTROLLER

FIELD OF THE INVENTION

This invention pertains generally to the field of power conversion and more particularly to a switching power supply with gated oscillator control.

RELATED APPLICATION DATA

This application is related to U.S. Ser. No. 09/444,032, filed Nov. 19, 1999 and U.S. Ser. No. 09/540,058, filed Mar. 31, 2000, the contents of both of which are hereby incorporated by reference.

BACKGROUND

Compact and efficient power supplies are an increasing concern to users and manufacturers of electronics. Pulse width modulated (PWM) switching power supplies offer both compactness and efficiency in a number of different topologies in two main categories: direct-coupled switching power supplies and transformer-coupled switching power supplies. In a direct-coupled switching power supply, such as a buck or boost switching power supply, the power output is not isolated from the power input. In contrast, the power output is isolated from the power input through a transformer in transformer-coupled power supplies such as a flyback converter.

In either type of power converter, however, a pulse-width-modulator controls the duty cycle of the power switch(es) within the converter. Consider, for example, a boost switching power supply 6 of FIG. 1. The boost converter 6 comprises a power switch Q1 (typically a field effect transistor (FET)) coupled to a boost inductor 8, a steering diode 10, and a storage capacitor 12. A pulse-width modulator 14 adjusts a duty cycle of the power switch Q1 in response to sensing an output voltage, $V_{out}$. The relationship between the input voltage, $V_{in}$, and $V_{out}$ may be approximated as $$V_{out} = V_{in} * (T/t_{off})$$

where T is the switching period and $t_{off}$ is the off time of the power switch Q1.

In this boost converter 6, the off time, $t_{off}$ (and hence also the on time, $t_{on}$) of the power switch Q1 defines a power cycle, or power pulse, which is reflected in the value of $V_{out}$ through the above equation. The power pulse is thus a regulated power pulse because its characteristics have a direct relationship on the output voltage. This relationship between the characteristics of a single power cycle or pulse and the output voltage is generic to prior art PWM switching power supplies, regardless of whether the PWM switching power supply is direct coupled or transformer coupled. Thus, a single power cycle or pulse in these prior art PWM switching power supplies may be denoted as an "intelligent" power cycle or pulse because of its effect on the output voltage. There is, however, a limit to the amount of pulse-width modulation these PWM switching power supplies can apply to a given power pulse. Thus, maximum efficiency for such power supplies is usually achieved at a fairly high power level and drops off quickly for load conditions above or below this power level. To aid efficiency, a "sleep mode" may be implemented such as described in U.S. Pat. No. 5,912,552 during a low load state wherein the power switch is kept in the OFF state for the duration of the "sleep" period.

Thus, there is a need in the art for improved switching power converters that maintain high efficiencies over a broad range of load conditions.

SUMMARY OF THE INVENTION

The invention provides in one aspect a switching power supply having a power switch wherein an ON and OFF cycle of the power switch produces an pulse of power at an output of the switching power supply. A controller controls the number of pulses of power appearing at the output over time.

Other aspects and advantages of the present invention are disclosed by the following description and figures.

DESCRIPTION OF FIGURES

The various aspects and features of the present invention may be better understood by examining the following figures:

FIG. 5b is a timing diagram for the converter of FIG. 5a.

FIG. 6b is a timing diagram for the converter of FIG. 6a.

FIG. 7b is a timing diagram for the converter of FIG. 7a.

FIG. 8b is a timing diagram for the converter of FIG. 8a.

DETAILED DESCRIPTION

Figure 1:
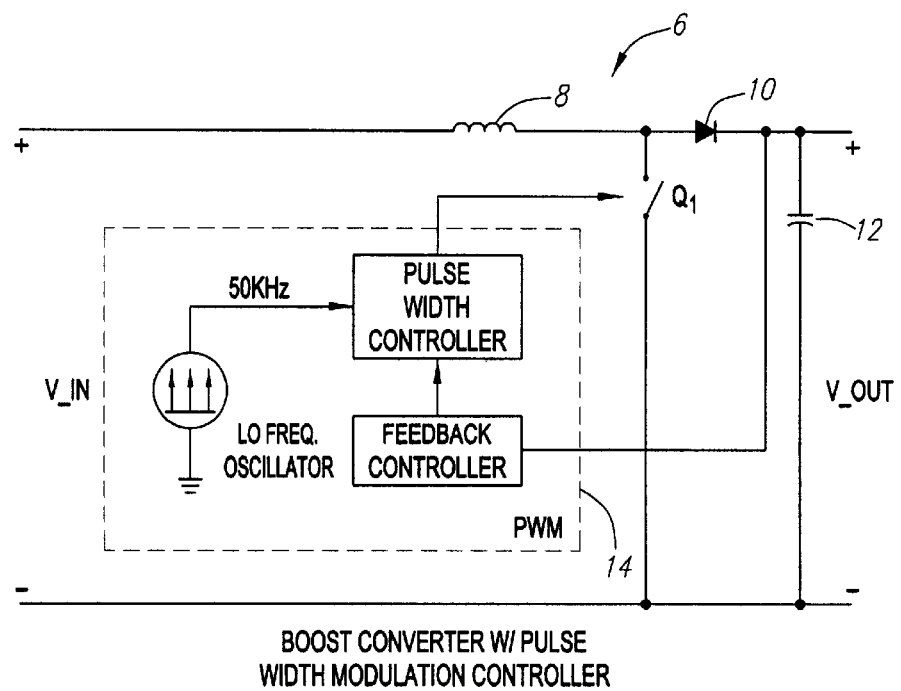
FIG. 1 illustrates a prior art PWM boost power converter.
Figure 2:
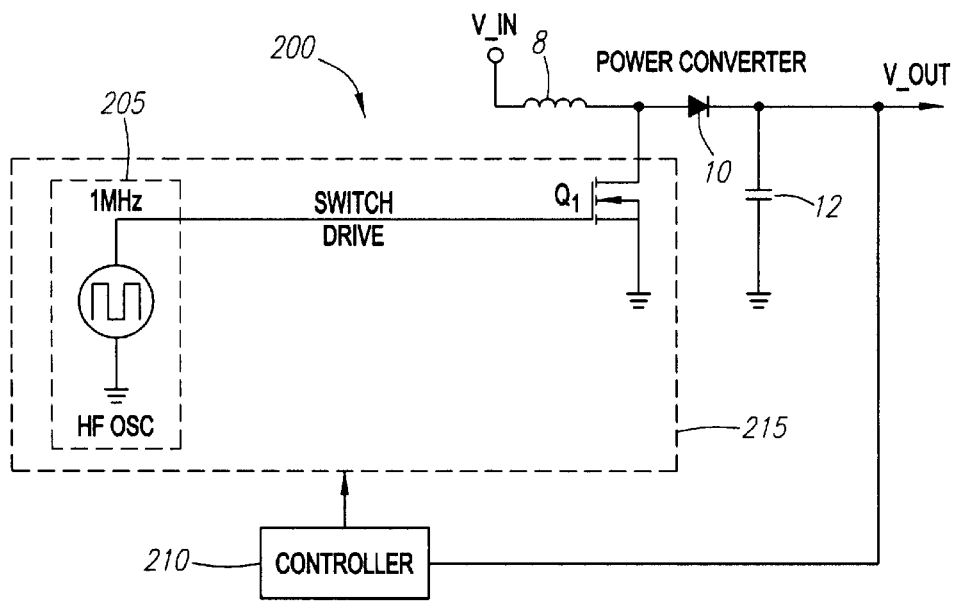
FIG. 2 illustrates a boost power converter according to one embodiment of the invention.

The control topologies and methodologies of the invention may be applied to any switching power converter. Turning now to FIG. 2, a boost power converter 200 according to one embodiment of the invention is illustrated. However, it will be appreciated that the features of the invention discussed with respect to FIG. 2 may be seen in other types of switching power converters. The boost power converter 200 shares the basic boost topology described with respect to the prior art boost power converter 6 of FIG. 1 formed by the power switch Q1, boost inductor 8, a steering diode 10, and a storage capacitor 12. A free-running oscillator 205 produces a drive signal for cycling the power switch Q1 ON and OFF. An ON and OFF cycle of the power switch Q1 creates a pulse of power at the output, increasing the voltage V_out. Unlike prior art switching power supplies, however, the ON and OFF times of the pulse are unregulated with respect to the output voltage. Thus, as used herein, a "free-running oscillator" generates a drive signal that cycles a power switch ON and OFF wherein the ON and OFF times of the power switch are not controlled with respect to an output voltage. Instead of controlling the ON and OFF times of the power switch, a controller 210 determines whether a given cycle of the free-running oscillator 205 causes a pulse of power at the output.

The controller 210, in response to comparing V_out to a desired level of output voltage, V_ref, controls whether the free-running oscillator 205 and the power switch Q1 produce a pulse of power. Because this control can be accomplished in a number of ways, the controller is shown controlling a switch control combination 215 formed by the free-running oscillator 205 and the power switch Q1. The switch control combination 215 would have an ON state during which the pulses of power would occur as defined by the cycles of the drive signal. In addition, the switch control combination 215 would have an OFF state during which the pulses of power would not occur. The controller 210 would switch the switch control combination into the ON and OFF states. Regardless of how the controller 210 controls the switch control combination 215, the switch control combination 215, if left uncontrolled, would produce pulses of unregulated power at the output as the drive signal cycled the power switch Q1 ON and OFF according to an oscillation frequency of the free-running oscillator 205. The oscillation frequency may be constant or vary randomly—it is not under feedback control and has no relationship to the output voltage V_out. In sharp contrast, prior art switching power converters, whether PWM or frequency modulated, will directly control the cycles of the drive signal to their power switches.

Figure 3A:
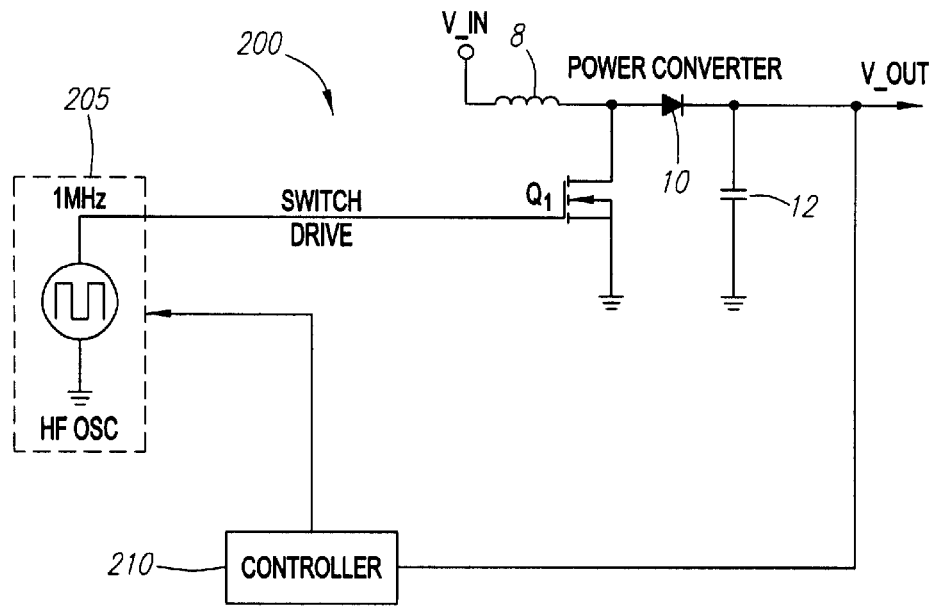
FIG. 3a illustrates a control topology for the converter of FIG. 2 wherein the controller couples directly to the free-running oscillator according to one embodiment of the invention.

Although the cycling of the drive signal is not under feedback control, the controller must do something to modulate the number of the resulting pulses of power occurring at the output over time. Specific examples of how the switch control combination 215 defines an ON and OFF state are illustrated in FIGS. 3*a* through 3*d*. For example, the controller 210 could couple directly to the free-running oscillator 205 and disable its operation to prevent it from producing the drive signal for a period during which no pulses of power are desired as illustrated in FIG. 3*a*. This period would correspond to an OFF state of the switch control combination 215. The period during which the controller 210 allows the free-running oscillator 205 to begin producing the drive signal would correspond to an ON state of the switch control combination 215.

Figure 3B:
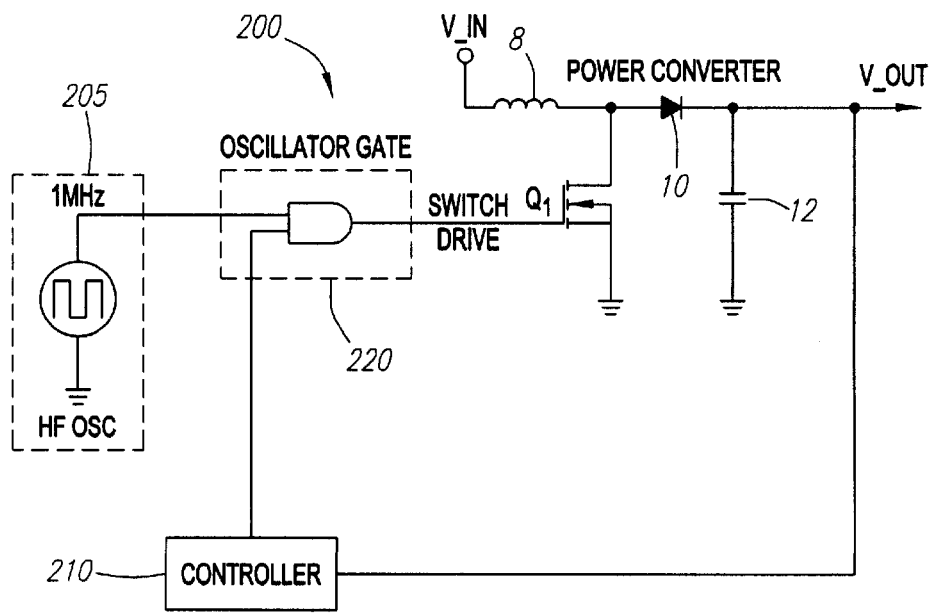
FIG. 3b illustrates a control topology for the converter of FIG. 2 wherein the controller couples to an oscillator gate according to one embodiment of the invention.
Figure 3C:
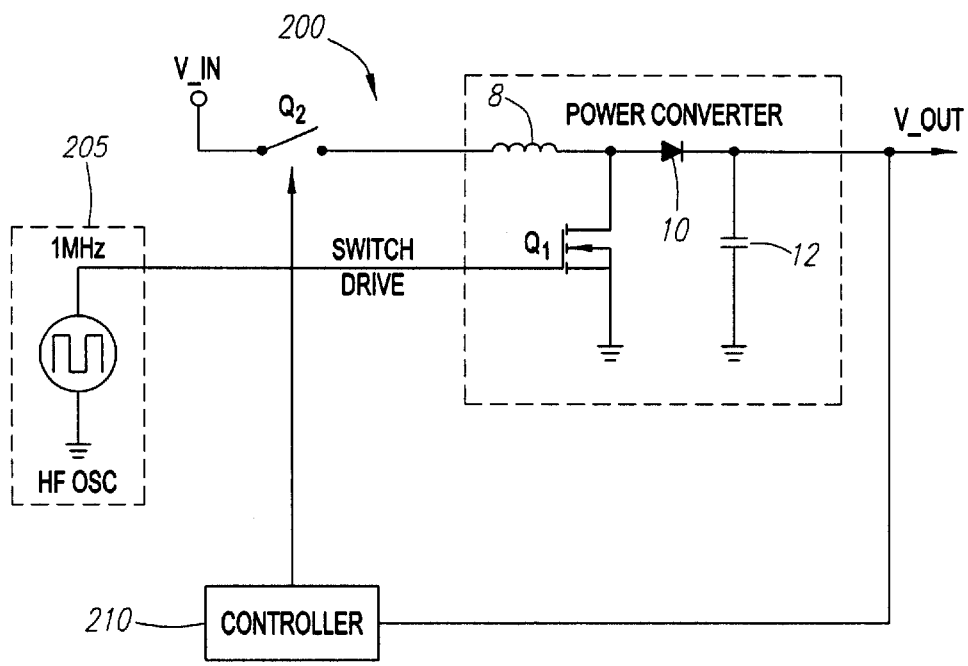
FIG. 3c illustrates a control topology for the converter of FIG. 2 wherein the controller couples to a second power switch according to one embodiment of the invention.

Alternatively, the free-running oscillator 205 could freely produce the drive signal, but the controller 210 could block the drive signal through a oscillator gate 220 as illustrated in FIG. 3*b*. When the controller 210 blocks the drive signal at the oscillator gate 220, the switch control combination 215 would be in the OFF state. If the controller 210 did not block the drive signal, the switch control combination 215 is in the ON state.

In an alternate embodiment, the drive signal could continue to cycle the power switch Q1, but the controller 210 could switch OFF a power switch Q2 coupled between the input and the inductor 8, preventing pulses of power from occurring at the output regardless of whether the power switch Q1 is cycled ON and OFF. Thus, if the controller 210 switches the power switch Q2 ON, the switch control combination 215 would be in the ON state. Alternatively, if the controller 210 switch the power switch Q2 OFF, the switch control combination 215 would be in the OFF state.

Figure 3D:
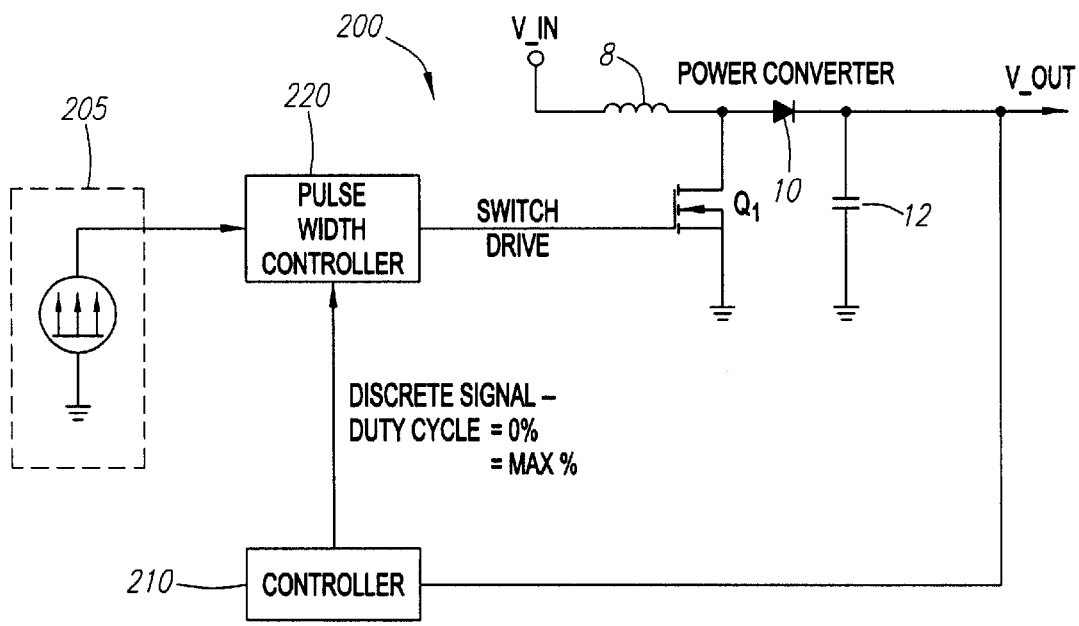
FIG. 3d illustrates a specific implementation of the control topology of FIG. 3b.

Turning now to FIG. 3*d*, an embodiment wherein the oscillator gate 220 is formed by a pulse width controller 220—is illustrated. The free-running oscillator 205 provides a timing signal for the pulse width controller 220. In response to the timing signal, the pulse width controller 220 may produce a drive signal having a fixed duty cycle. The controller 210 determines whether the pulse width controller produces the drive signal. During a period corresponding to the OFF state of the switch control combination 215, the controller 210 prevents the pulse width controller from responding to the timing signal. This state may be thought of as having a "drive signal" with a 0% duty cycle. During a period corresponding to the ON state of the switch control combination 215, the controller 210 allows the pulse width controller to respond to the timing signal to produce the drive signal having a fixed duty cycle.

Figure 4:
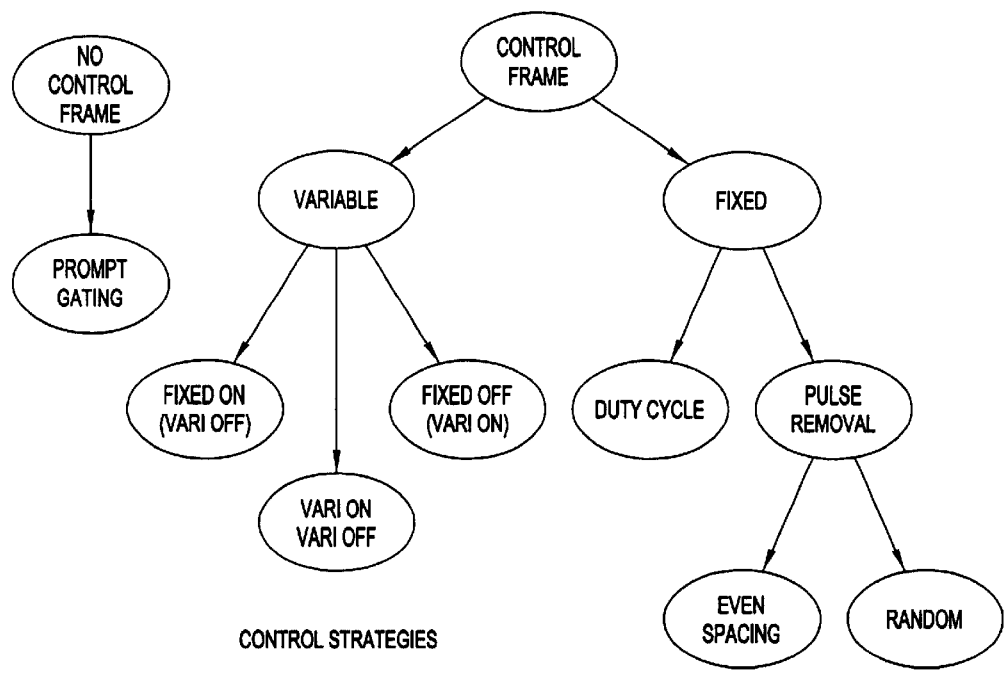
FIG. 4 illustrates the relationship of various control strategies according to one embodiment of the invention.

Regardless of how the controller couples to the switch control combination 215 formed by the free-running oscillator 205 and the power switch Q1, a number of control methodologies may be implemented to regulate the output voltage, V_out. These control methodologies are summarized in FIG. 4. These control methodologies or strategies may be broadly classified into two categories: those with a control frame and those without a control frame. To regulate V_out, the controller 210 may be coupled to a signal proportional to V_out so that an error signal representing the difference between the current value of V_out and a desired level of output voltage, V_ref, can be generated. The controller 210 then regulates V_out according to the error signal. This regulation is accomplished by controlling the switch control combination 215 to prevent pulses of power from occurring at the output. Without this control, a series of cycles of the drive signal produced by the free-running oscillator 205 would produce a pulse train of power pulses at the output. A given time period for a pulse train could define a control frame over which the controller 210 would selectively remove pulses to regulate V_out.

The control frames could be of fixed length of variable length. Within a fixed control frame, the controller 210 could switch the switch control combination 215 into the ON and OFF states to control the number of pulses occurring at the output in several different embodiments. For example, the ON and OFF states could define a pulse train of pulses having a duty cycle defined by the length of the pulse train with respect to the fixed frame control period wherein the controller 210 varies the duty cycle to regulate the output voltage, V_out. In an alternate embodiment, the ON and OFF states of the switch control combination 215 would be varied to remove randomly remove the necessary number of pulses from the pulse train within the fixed control frame. In another alternate embodiment, the removal of the necessary number of pulses could occur at harmonics of the frequency defined by the fixed control frame period, a control strategy denoted "even spacing" of pulse removal.

If the control frame is variable, a number of alternate control strategies may be employed. For example, the ON state of the switch control combination 215 could occur within a fixed period within the variable control frame, resulting in a variable period for the OFF state. Alternatively, the OFF state of the switch control combination 215 could occur within a fixed period with the variable control frame, resulting in variable period for the ON state. In yet another alternate embodiment, the periods for the ON and OFF states could both be variable within the variable control period.

Embodiments of the invention wherein no control frame exists may be considered to perform a "prompt gating." In such embodiments, the controller determines, on a pulse-by-pulse basis, whether a pulse of power occurs at the output. In that sense, it may be construed as having a "control frame" comprising just one pulse. The control strategies of FIG. 4 will now be discussed with respect to specific embodiments of the invention.

Figure 5A:
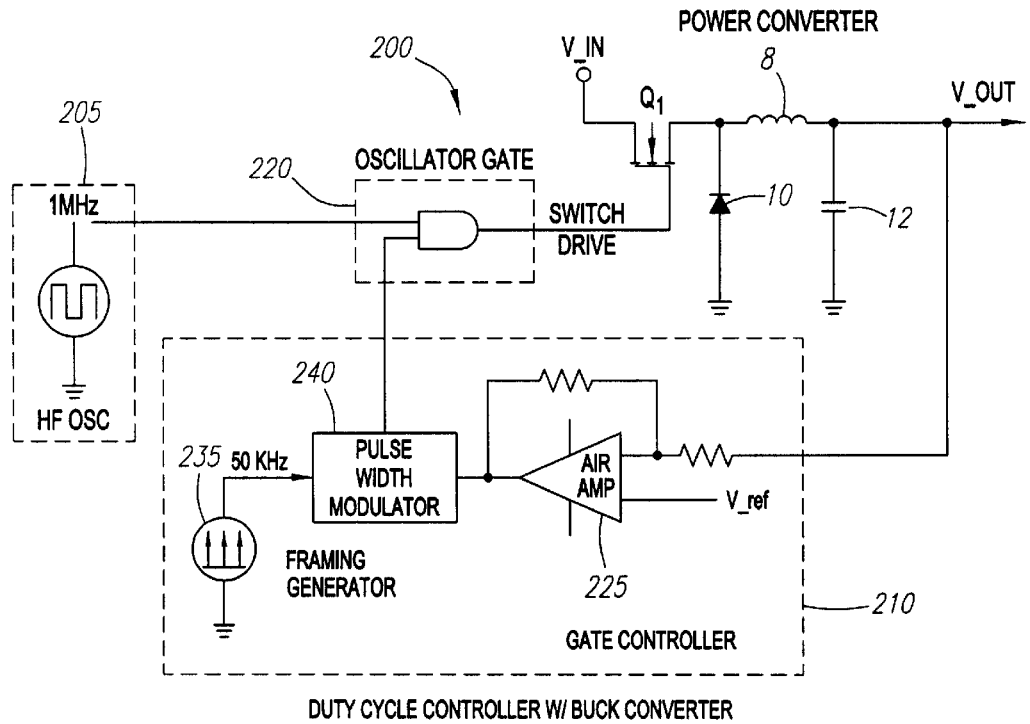
FIG. 5a illustrates a buck converter having a fixed frame control according to one embodiment of the invention.

Turning now to FIG. 5a, a buck converter 221 wherein the pulses of power define a duty cycle with respect to a fixed control frame is illustrated. The basic buck topology is formed by the steering diode 10, power switch Q1, inductor 8, and storage capacitor 12. A free-running oscillator 205 generates an alternating drive signal for cycling the power switch ON and OFF to produce pulses of power at the output. To regulate V_out, the controller 210 cyclically blocks the drive signal at an oscillator gate 215 to limit the number of pulses of power within a fixed control frame. The fixed control frame may be defined by a framing generator 235 that synchronizes the operation of a pulse width modulator 240 by generating timing pulses at the start of each fixed control frame. The pulse width modulator 240 adjust the amount of time the drive signal is not blocked at the oscillator gate 215 according to an error signal generated by an error amplifier 225. During this time, corresponding to the ON state of the switch control combination 215 described with respect to FIG. 2, a pulse train comprising a series of the pulses of power resulting from the alternating drive signal occur at the output, increasing V_out. The pulse width modulator adjusts the length of this pulse train with respect to the fixed control frame to regulate V_out. Thus, although it operates equivalently to a pulse width modulator such as shown in FIG. 1, the pulse width modulator 240 is actually a "pulse train" width modulator.

Figure 5B:
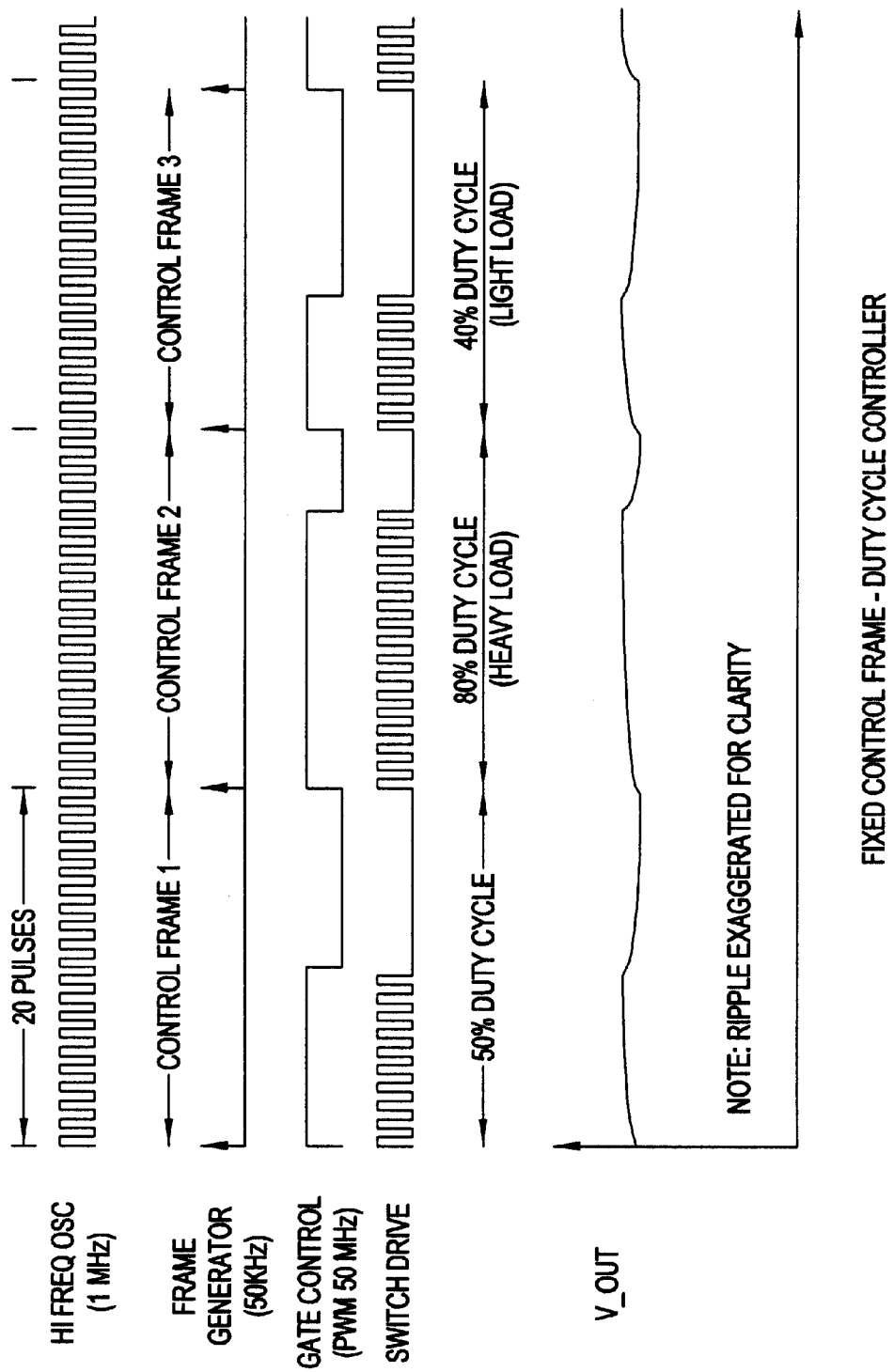

The pulse width modulator 240 is responsive to an error signal. To generate the error signal, the error amplifier 225 compares a voltage proportional to V_out to a reference voltage, V_ref. As changing load conditions changes V_out, the error signal will change, causing the pulse width modulator 240 to adjust the width of the pulse train accordingly. A timing diagram for the various signals within the buck converter 220 is illustrated in FIG. 5b. As can be seen the free-running oscillator 205 generates, in this embodiment, an alternating drive signal having a constant 1 MHz frequency. The pulse width modulator 240 adjusts, according to the error signal, a blocking signal coupled to the oscillator gate 220. This blocking signal is synchronized by the frame generator 235, shown generating a fixed control frame whose period corresponds to a 50 KHz rate. In the first control frame, which has a nominal load condition, the pulse width modulator sets a 50% duty cycle such that 10 cycles of the drive signal pass through the oscillator gate 220 within the fixed control frame because of the 1 MHz drive signal frequency. These 10 cycles produce a pulse train at the output having 10 power pulses. Due to changing load conditions, the pulse width modulator 240 sets an 80% duty cycle in the second fixed control frame. Thus, 16 pulses of power occur at the output in this control frame. In the third fixed control frame, the load conditions have lightened so that the pulse width modulator 240 sets a 40% duty cycle. This corresponds to allowing 8 pulses of power through in the pulse train for this control frame. Note that, if the controller 210 did not block the drive signal at the oscillator gate 220, 20 pulses of power would occur at the output within the fixed control frame. Thus, the controller can be viewed as gating or blocking a selected number of these pulses within the fixed control frame to regulate the output voltage, V_out.

It will be appreciated that, for the embodiments discussed herein, any suitable method, such as those shown in FIGS. 3a through 3d, may be implemented to gate or block the pulse train to regulate the output voltage. Moreover, the selection of the free-running oscillator frequency and the fixed control frame period are arbitrary. In addition, a more sophisticated feedback system may be used to replace the error signal controller implemented by the controller 210 in FIG. 5a. For example, a more sophisticated controller may be derived from classic control theory, optimal control theory, fuzzy logic, or some combination of these approaches including heuristics. The controller can be tailored to provide the performance characteristics that are important for an intended application of the power converter. These performance characteristics are many and meeting specific application requirements usually requires engineering tradeoffs among them. They include, but are not limited to: ripple amplitude, ripple spectrum, control loop stability, output voltage regulation, slew rate, thermal stress, and electromagnetic interference (EMI).

Figure 6A:
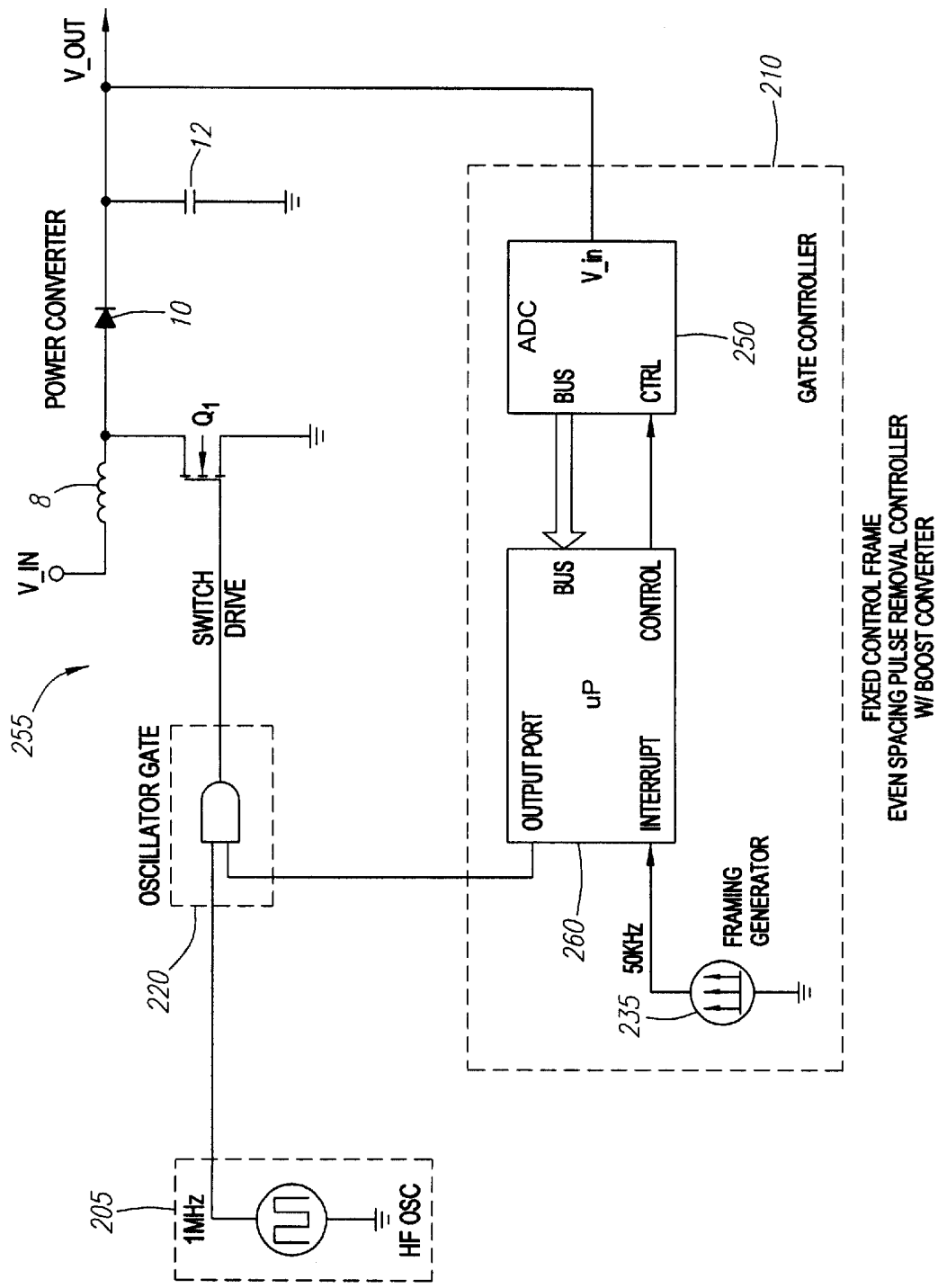
FIG. 6a illustrates a boost converter having a fixed frame control with even spacing pulse removal according to one embodiment of the invention.

As discussed above with respect to FIG. 5b, the controller may be viewed as removing pulses from what would otherwise be an uninterrupted train of pulses of power occurring at the output. Rather than having the pulses of power that do occur at the output within the control frame all be in consecutive order, as is done in the duty cycle embodiment of FIG. 5a, the controller may employ other types of pulse removal methods. Turning now to FIG. 6a, a boost power converter 255 that performs pulse removal is illustrated. The boost power converter has the basic boost topology provided by the inductor 8, power switch Q1, steering diode 10, and storage capacitor 12 as shown in FIG. 1.

In the boost power converter 255, a controller 210 uses a microprocessor 260 to calculate the required number M of pulses that will be removed within a fixed control frame. The pulses are removed by blocking the drive signal coming from the free-running oscillator 205. Within the gate controller 210, a analog-to-digital converter (ADC) 250 provides a digital signal representative of the output voltage, V_out. The microprocessor samples the digital signal at the start of a fixed control frame as determined by a timing pulse generated by the framing generator 235 and calculates M based upon a control algorithm. The control algorithm may be based upon the control strategies listed with respect to the duty cycle control discussed with respect to FIG. 5a.

Figure 6B:
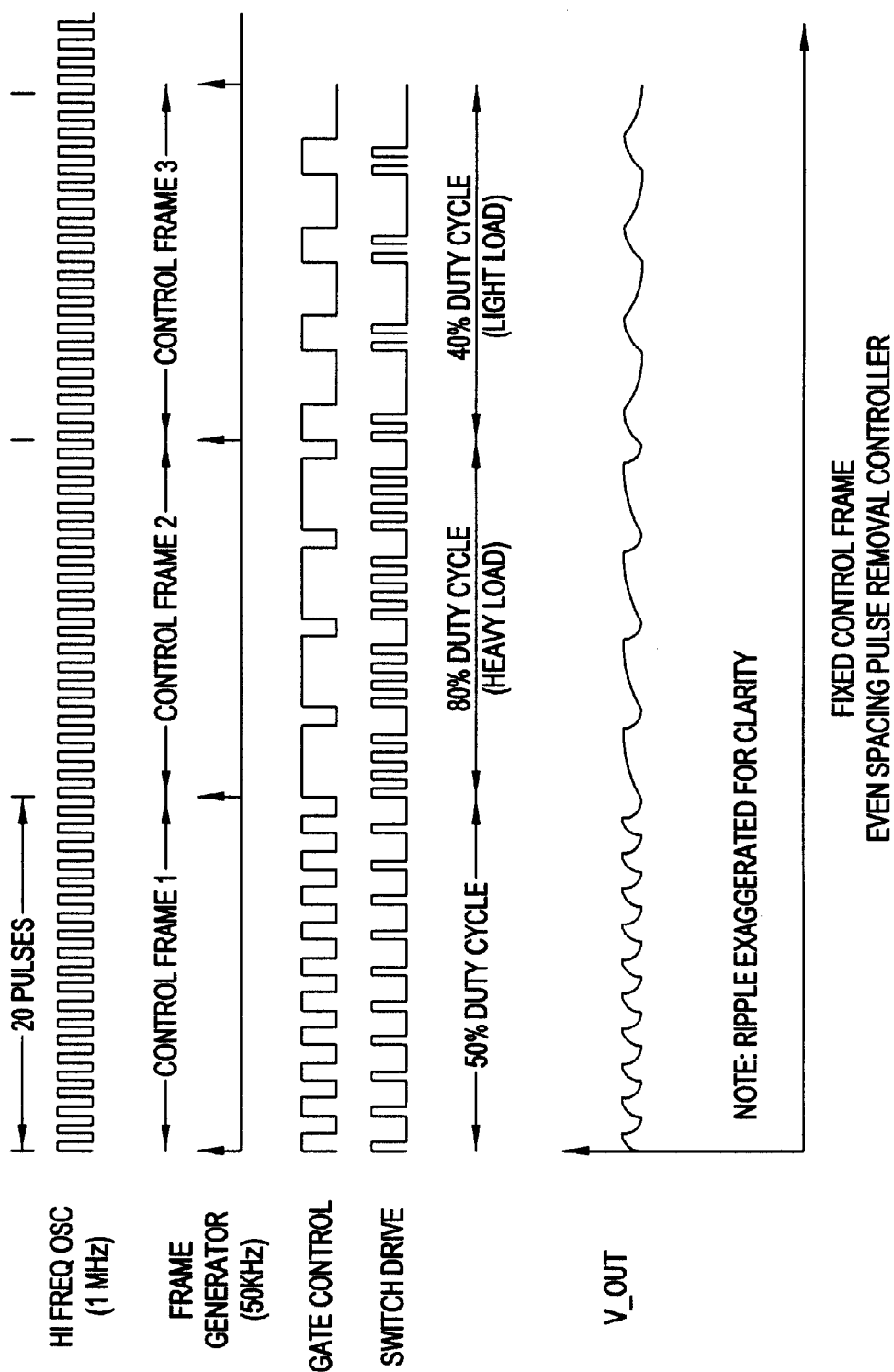
Figure 6C:
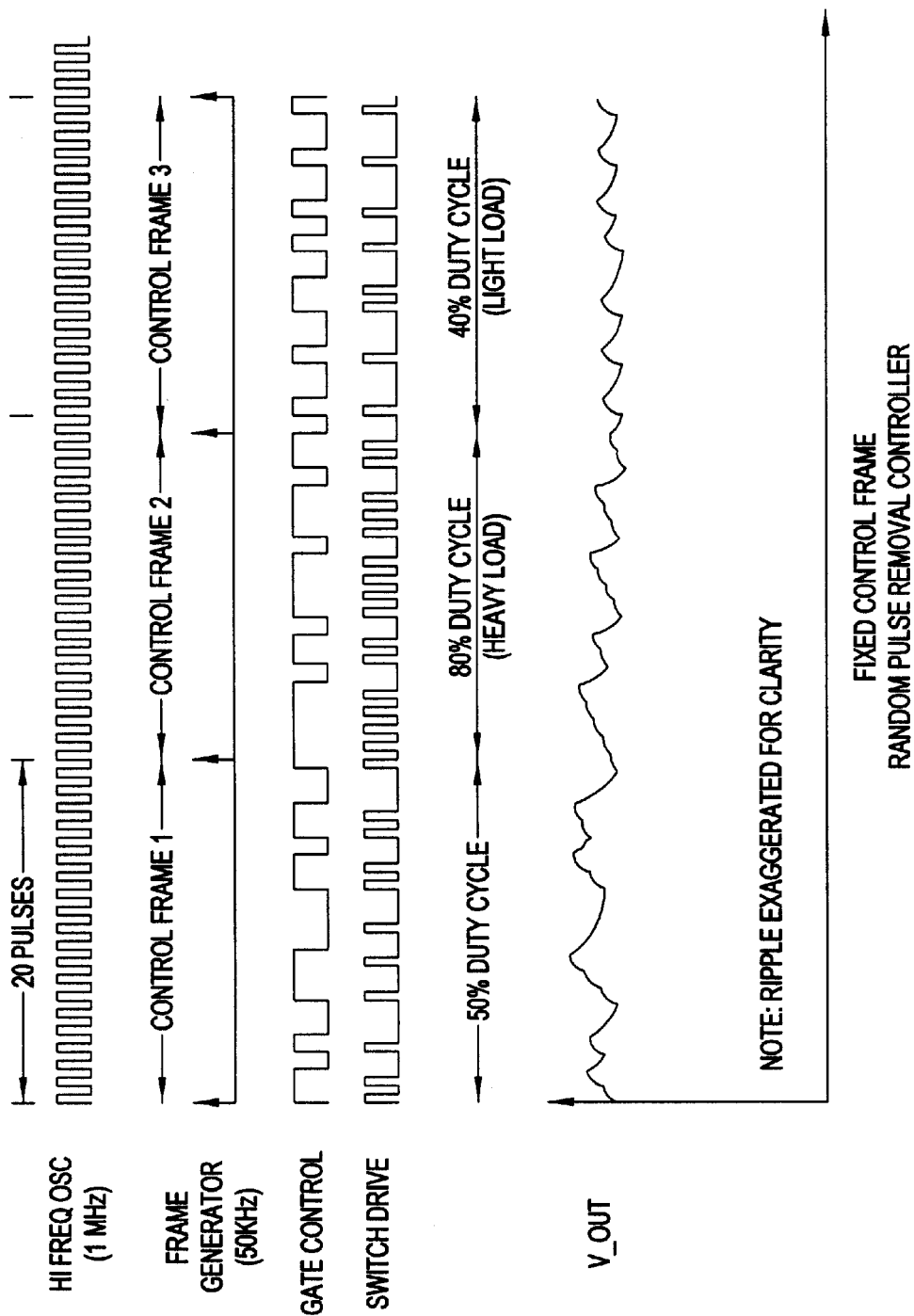
FIG. 6c is a timing diagram for a converter having a fixed frame control with random pulse removal according to one embodiment of the invention.

The microprocessor 260 provides considerable flexibility in how the M pulses are removed. For example, the M pulses can be removed such that the removed pulses are evenly spaced throughout the fixed control frame. FIG. 6b provides a timing diagram for such a pulse removal method. Just as in FIG. 5b, the drive signal cycles at a frequency of 1 MHz and the timing pulses from the frame generator cycle at 50 KHz. In control frame 1, a nominal load condition is present such that M=10 pulses are to be removed within the control frame. These pulses are removed at every other cycle of the drive signal so that the removed pulses are evenly spaced. In control frame 1, a heavy load condition exists such that M=4 pulses are to be removed within the control frame. To evenly space these four removed pulses requires removing every 5$^{th}$ pulse within the fixed control frame. Finally, in control frame 3, a light load condition exists such that M=12 pulses are to be removed within the control frame. Evenly spacing these pulses requires removing every 3$^{rd}$, 4$^{th}$, and 5$^{th}$ pulse within the control frame. Alternatively, as shown in the timing diagram of FIG. 6c, the removed pulses could be randomly placed. The number of pulses M to be removed and the load conditions in the fixed control frames are as in FIG. 6b. However, the particular pulses removed within the fixed control frames vary randomly. It will be appreciated that the drive cycle frequency and period of the fixed control frame are arbitrary.

Figure 7A:
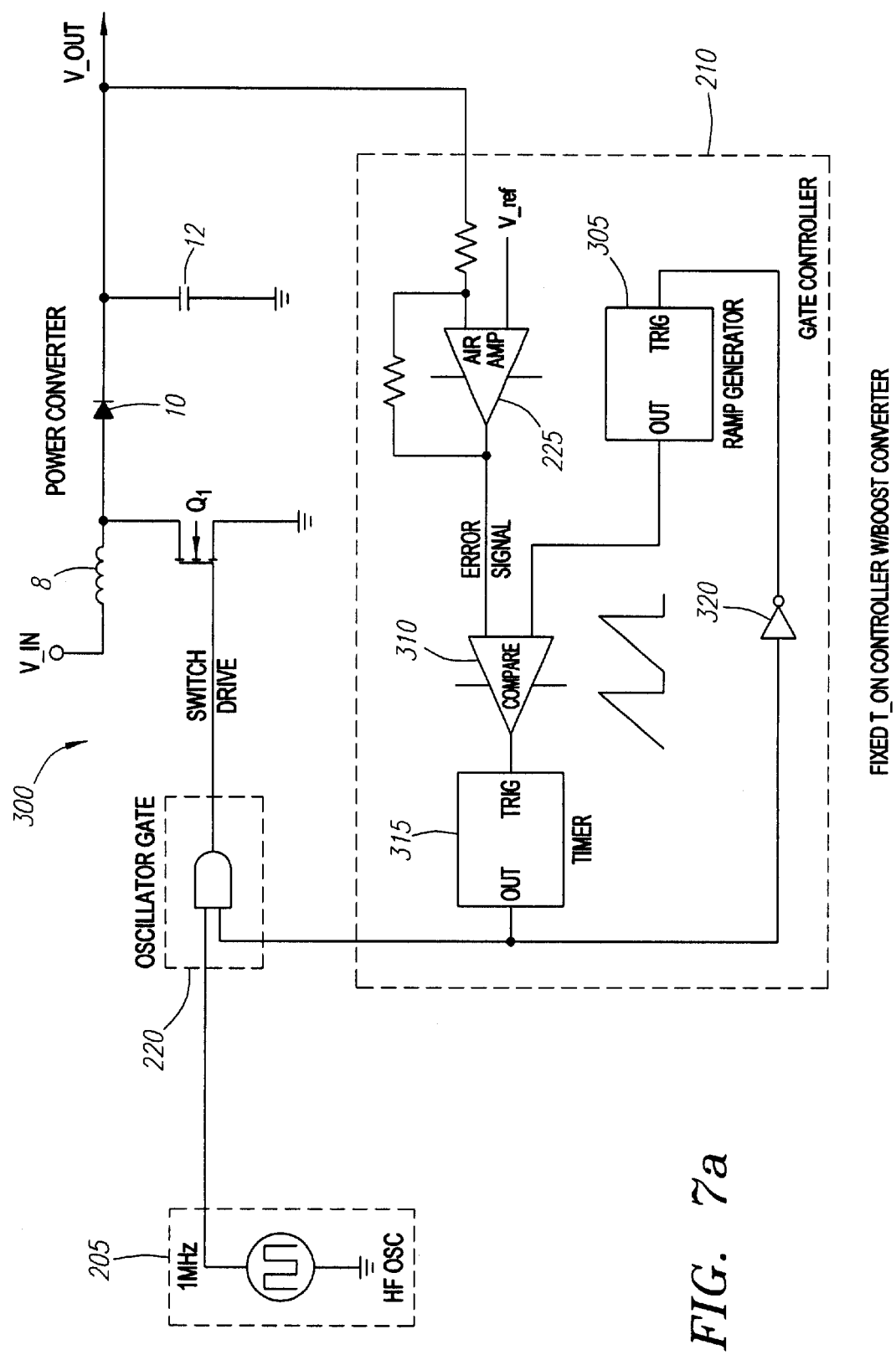
FIG. 7a illustrates a boost converter having a variable control frame wherein a pulse train within the variable control frame has a fixed length according to one embodiment of the invention.
Figure 7B:
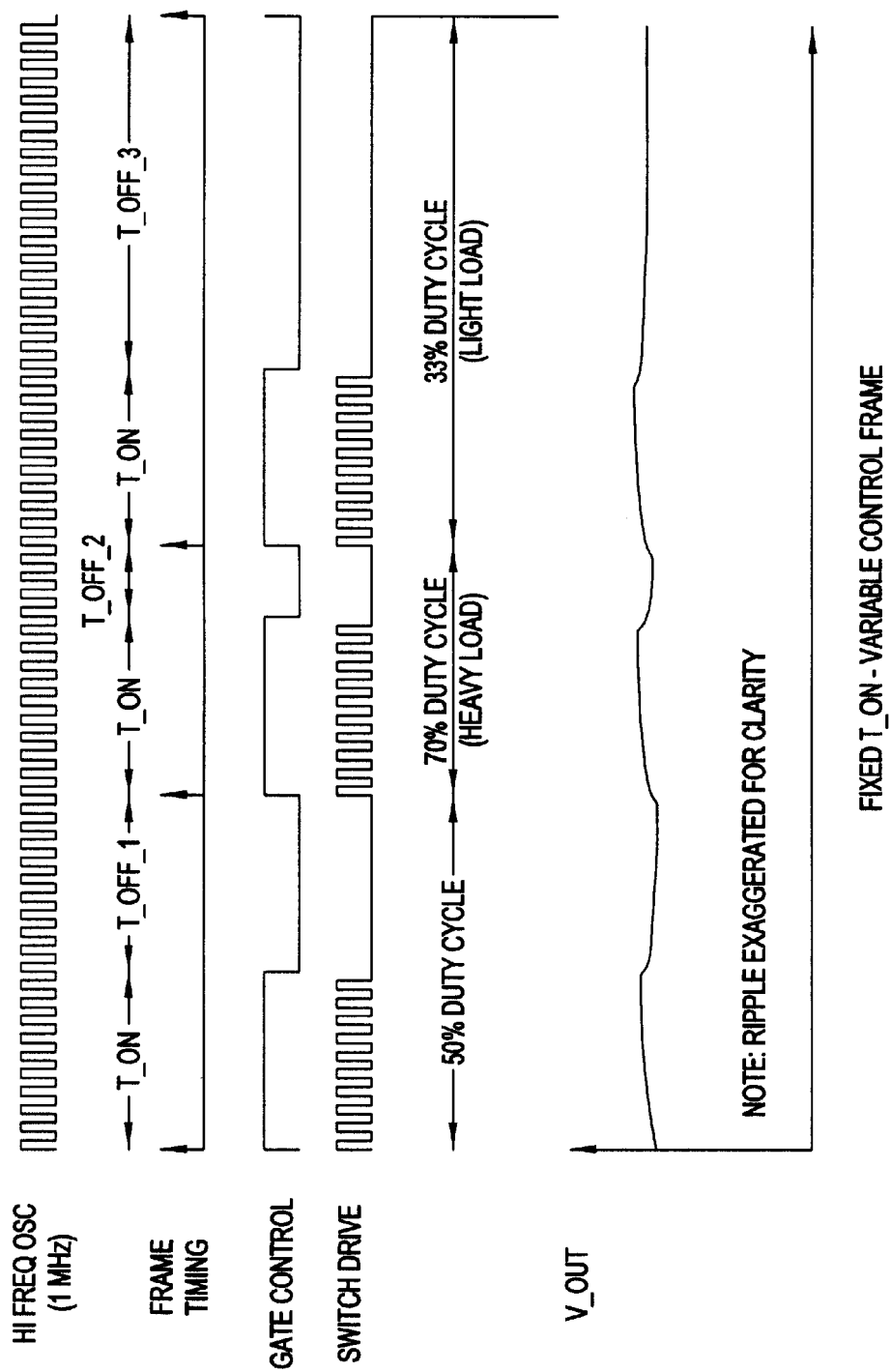

Rather than using a fixed control frame, a variable control frame may be implemented. Within this variable control frame, the length, T_on, of the pulse train of power pulses occurring at the output may be constant. Turning now to FIG. 7a, a boost power converter 300 having a constant or fixed T_on time is illustrated. The boost power converter 300 has the basic boost topology as described with respect to FIG. 1. The controller 210 includes an error amplifier 225 generating an error signal proportional to the difference between the output voltage, V_out, and a reference voltage, V_ref. A comparator 310 compares a ramp signal produced by ramp generator 305 to the error signal to pulse width modulate the period during which a gate signal is applied to the oscillator gate 220 (corresponding to the OFF state of the switch control combination 215 discussed with respect to FIG. 2). If the output of the comparator is high, it triggers a timer 315 to lower the gate signal and un-block the drive signal at the oscillator gate 220 for a fixed period, T_on. During this period T_on, the free-running oscillator 205 cycles the drive signal to produce a pulse train of power at the output according to the free-running oscillator frequency. As the timer 315 times out, it triggers the ramp generator to begin another ramp signal. Note that an inverter 320 may be required depending upon the characteristics of the ramp generator's trigger. FIG. 7b illustrates the resulting timing diagram. For the three consecutive variable control frames shown, a nominal, heavy, and light load condition exists, respectively. Because of the changing load conditions, the time, T_off, during which the gate signal to the oscillator gate 220 blocks the drive signal varies. Thus, a 50%, 70%, and 33% duty cycle is defined accordingly for these load conditions.

Figure 8A:
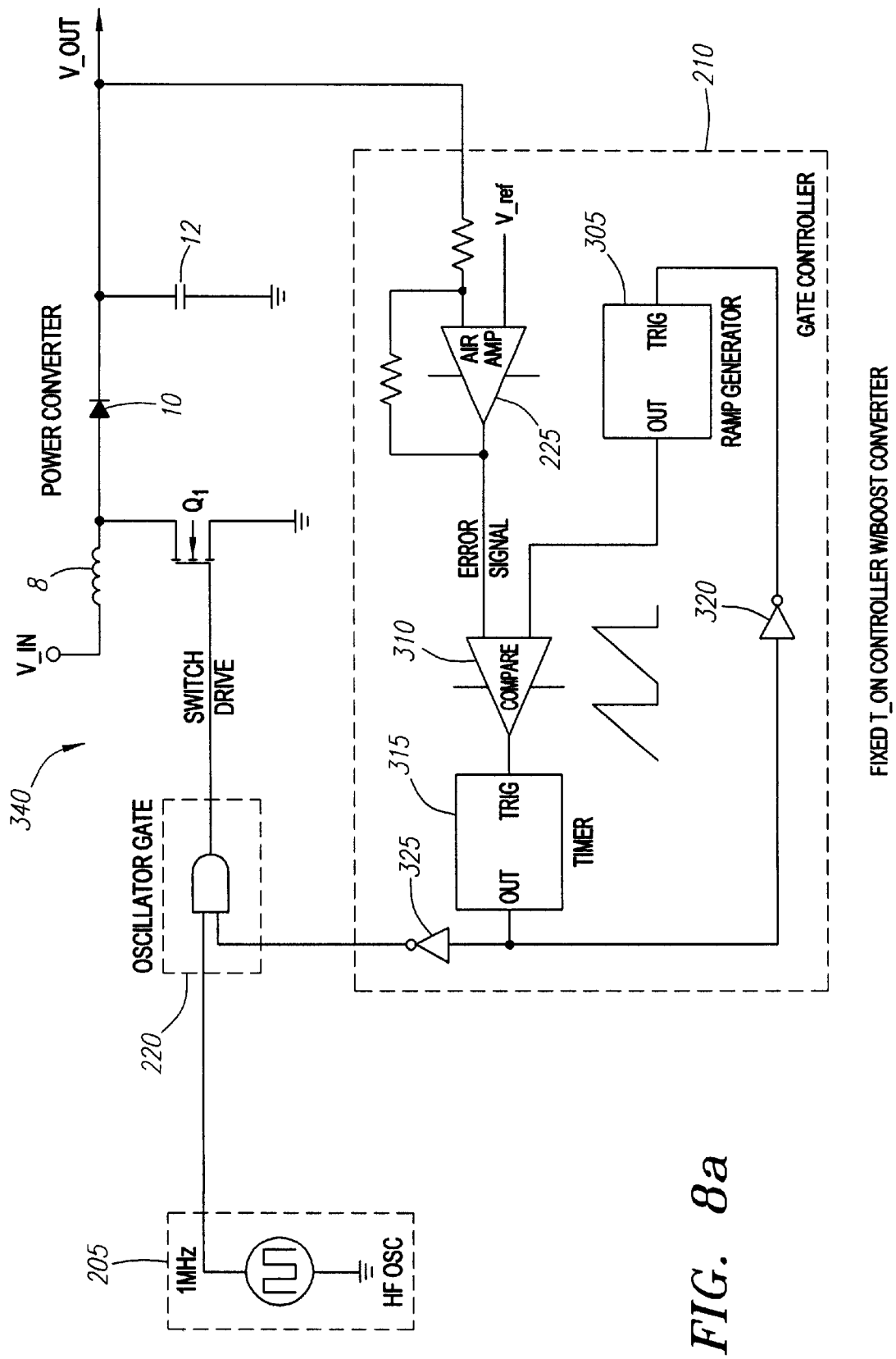
FIG. 8a illustrates a boost converter having a variable control frame wherein a pulse removal period has a fixed length within the variable control frame according to one embodiment of the invention.
Figure 8B:
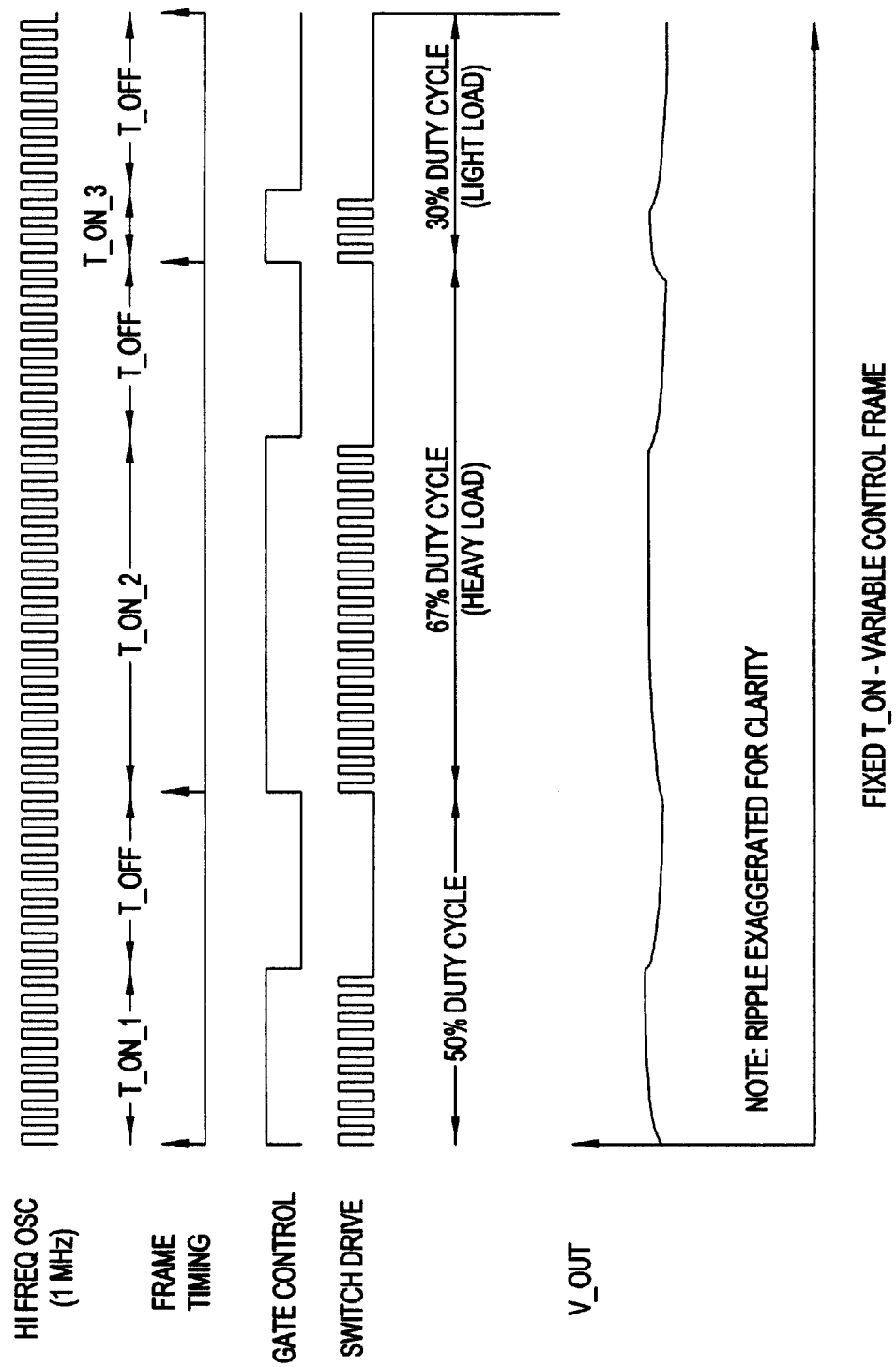

Turning now to FIG. 8a, a boost power converter 340 having a fixed time, T_off, within a variable control frame is illustrated. In this embodiment, the components are as described with respect to FIG. 8b, except that an inverter 325 couples between the inverter 315 and oscillator gate 220. Thus, as the output of the comparator 310 goes high and triggers the timer 315, it begins a fixed period, T_off, in which the gate signal blocks the drive signal at the oscillator gate 220. FIG. 8b illustrates the resulting timing diagram. A nominal, heavy, and light load condition exists for the three variable control frames shown, respectively. Because of the changing load conditions, the time, T_on, during which the gate signal to the oscillator gate 220 un-blocks the drive signal varies. Thus, a 50%, 67%, and 30% duty cycle is defined accordingly for these load conditions.

Figure 9:
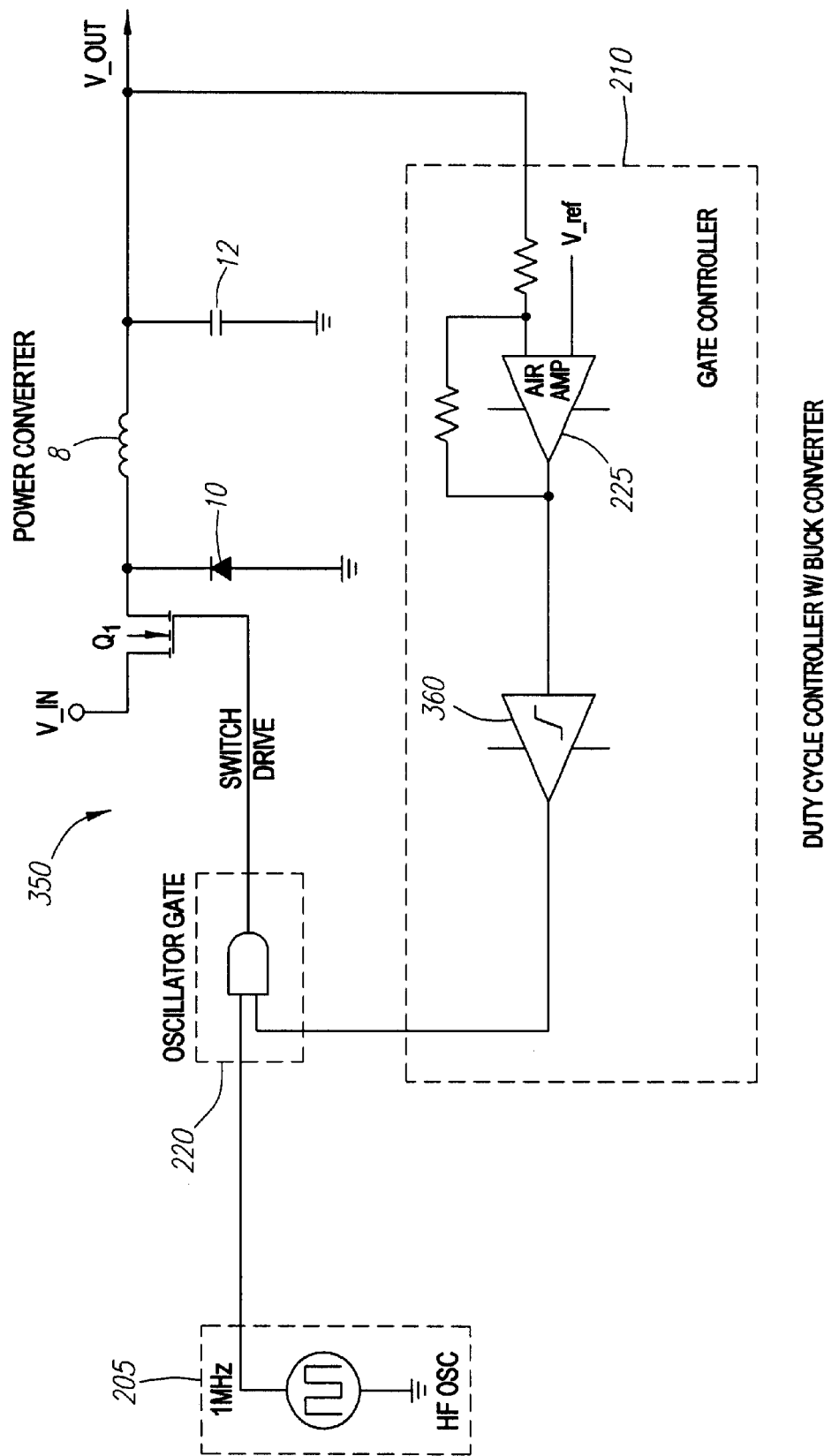
FIG. 9 is a schematic illustration of a buck converter that does not define a control frame.

In yet another alternate embodiment of the invention, the regulation of the output voltage does not depend upon or define a control frame. Turning now to FIG. 9, a buck power converter 350 that does not define a control frame is illustrated. The buck power converter 350 has the basic buck topology as discussed with respect to FIG. 5a. Similarly, the controller 220 generates a gate signal to block the drive signal from the free-running oscillator 205 at the oscillator gate 220. However, no framing generator defines a control pulse. Instead, the error signal generated by the error amplifier 225 within the controller couples to a comparator 360 to form the drive signal. Thus, the controller 210 will decide within each cycle of the drive signal whether a pulse of power will occur at the output.

Figure 10:
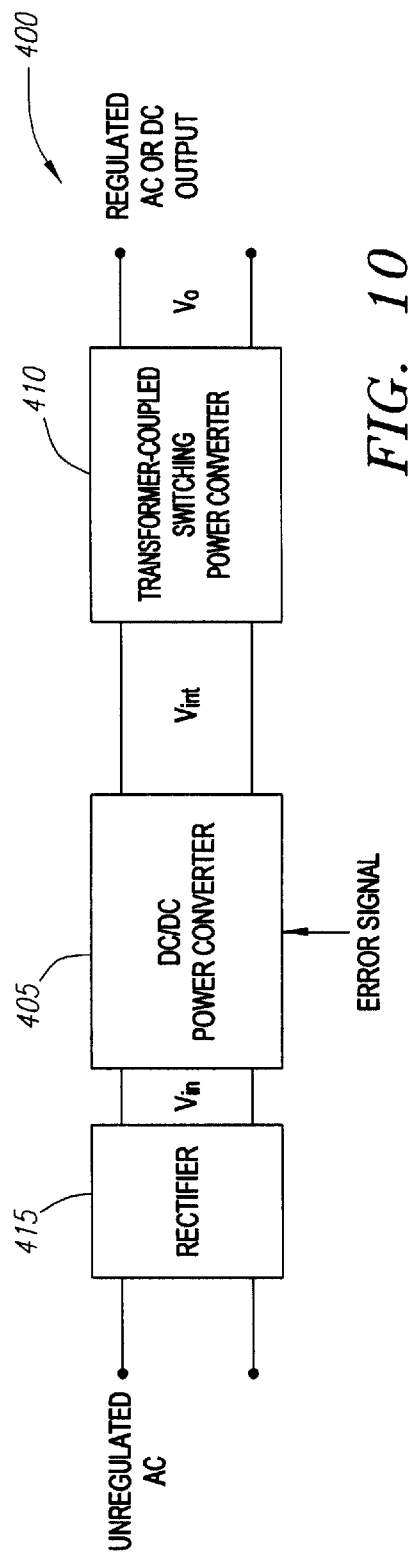
FIG. 10 is a block diagram for a pre-regulated power converter.

Regardless of how the controller regulates the removal of pulses from the pulse train at the output of the power converter, the features of the invention may be combined with the unique error signal described in U.S. Ser. No. 09/444,032, filed Nov. 19, 1999 and U.S. Ser. No. 09/540,058, filed Mar. 31, 2000. This unique error signal permitted the regulation of a transformer-coupled switching power converter without requiring feedback from the secondary side (load side) of the transformer, thus obviating the need for optoisolators or similar isolating means normally required for such feedback. To distinguish the embodiments of the power converters disclosed in these previous applications from the present invention, they will be referred to as "pre-regulated" power converters. Consider the pre-regulated power converter 400 illustrated in FIG. 10. In this embodiment, a voltage regulator or DC/DC converter 405 couples to a DC/AC transformer-coupled switching power converter 410. Because of these two stages, the pre-regulated power converter 400 has a "dual converter" topology. The power converter 400 receives an unregulated DC voltage input, V$_{in}$, which may be generated by a rectifier or AC/DC converter 415 operating on an unregulated AC input, V$_{ac}$, to generate a regulated AC or DC output voltage, V$_O$. The transformer 420 (illustrated in FIG. 11) for the transformer-coupled DC/AC switching power converter 410 isolates the regulated AC or DC output voltage, V$_O$, from the unregulated DC voltage input, V$_{in}$.

Within the pre-regulated power converter 400, the DC/DC converter 405 receives the unregulated DC input voltage, V$_{in}$, and produces an internal regulated voltage output, V$_{int}$, that is regulated by a voltage controller 425 (illustrated in FIG. 11) according to an error signal whose generation will be described herein. Because the voltage output, V$_{int}$, is internal to the pre-regulated power converter 405, it may be considered "pre-regulated" as compared to the regulated output voltage, V$_O$.

The error signal for the pre-regulated power converter 400 is derived from both the internal regulated voltage output, V$_{int}$, and a signal proportional to the voltage losses at the load. As used herein, "voltage losses at the load" refers to the losses incurred between the primary winding of the transformer 420 and the load. This includes losses in the transformer 420, losses in a rectifier or AC/DC converter imposed between the load and the transformer, and conduction losses. For example, suppose a power supply is specified to produce 5 volts at the load. If the load is not drawing any current, these losses will be minimal, allowing the power supply to produce 5 volts at the load. However, during a period of heavy demand in which the load is drawing a relatively large current, these conduction losses will be appreciable, resulting in a voltage drop below 5 volts at the load. Prior art power supplies typically accounted for these conduction losses by directly sensing the voltage at the load and feeding this sensed voltage back into the power supply. Because the load is isolated through the transformer 420, such direct sensing of the losses required the use of optoisolators or other isolating means, complicating the design of such power supplies. In contrast, the error signal used in the pre-regulated power converter 400 permits the voltage losses at the load to be indirectly sensed by sensing the current through the primary winding of the transformer 420.

Figure 11:
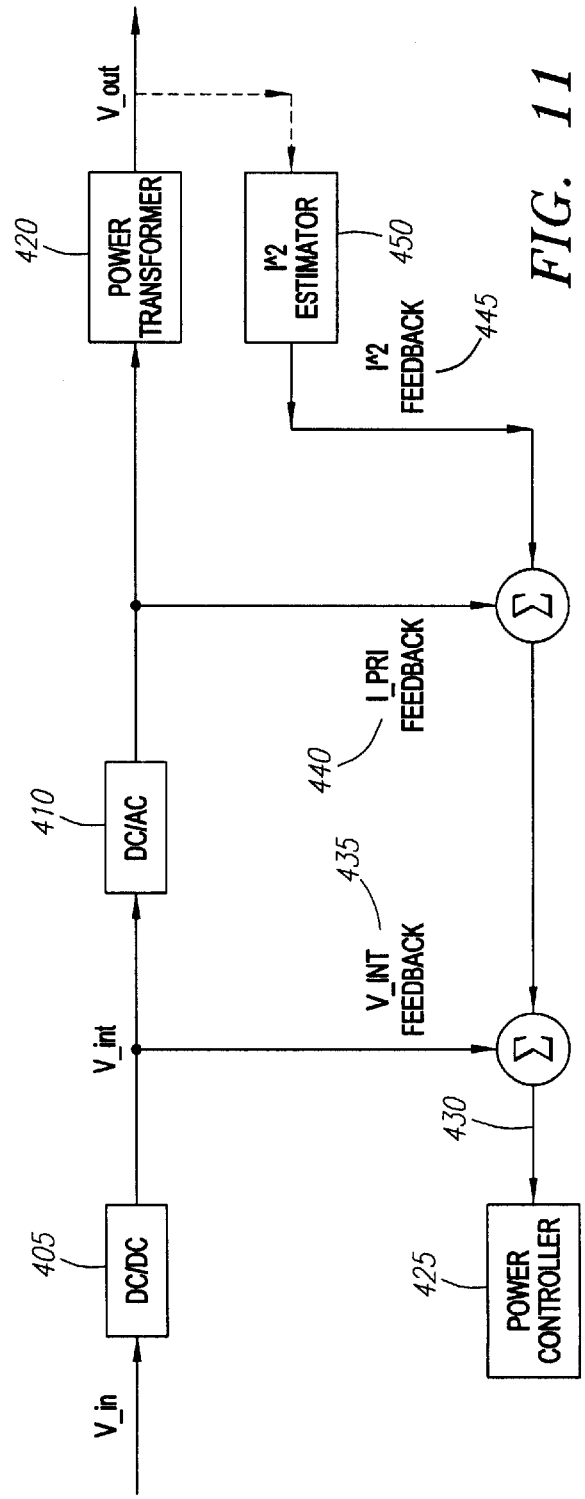
FIG. 11 illustrates the feedback paths for the power converter of FIG. 10.

Turning now to FIG. 11, the unique feedback path of the pre-regulated power converter 400 is further illustrated. The internal voltage output, $V_{int}$, is regulated by the DC/DC converter 405 under the control of the voltage controller 425. In turn, the voltage controller 425 is responsive to an error signal 430 representing feedback from three separate signals: feedback from the internal voltage output, denoted as $V_{int}$ feedback 435; feedback from the current through the primary winding, denoted as $I_{PR}$ feedback 440; and feedback from a voltage proportional to the voltage losses at the load, denoted as $I^2$ feedback 445. Note that no direct feedback is necessary from the secondary (load) side of the transformer 420. Instead, the pre-regulated power converter 400 senses the current through the primary winding of the transformer 420. As will be further described herein, because the power switch(es) within the DC/AC switching power converter 410 is controlled to produce an alternating current through the primary winding of the transformer 420 having a constant duty cycle, the currents through the primary winding and the secondary winding are linearly related. In turn, this indicates that by sensing the primary current, $I_{PR}$, the present invention may indirectly sense the current through the secondary winding. An estimator 450, described further herein, processes this indirectly sensed current to estimate the voltage losses at the load.

Figure 12:
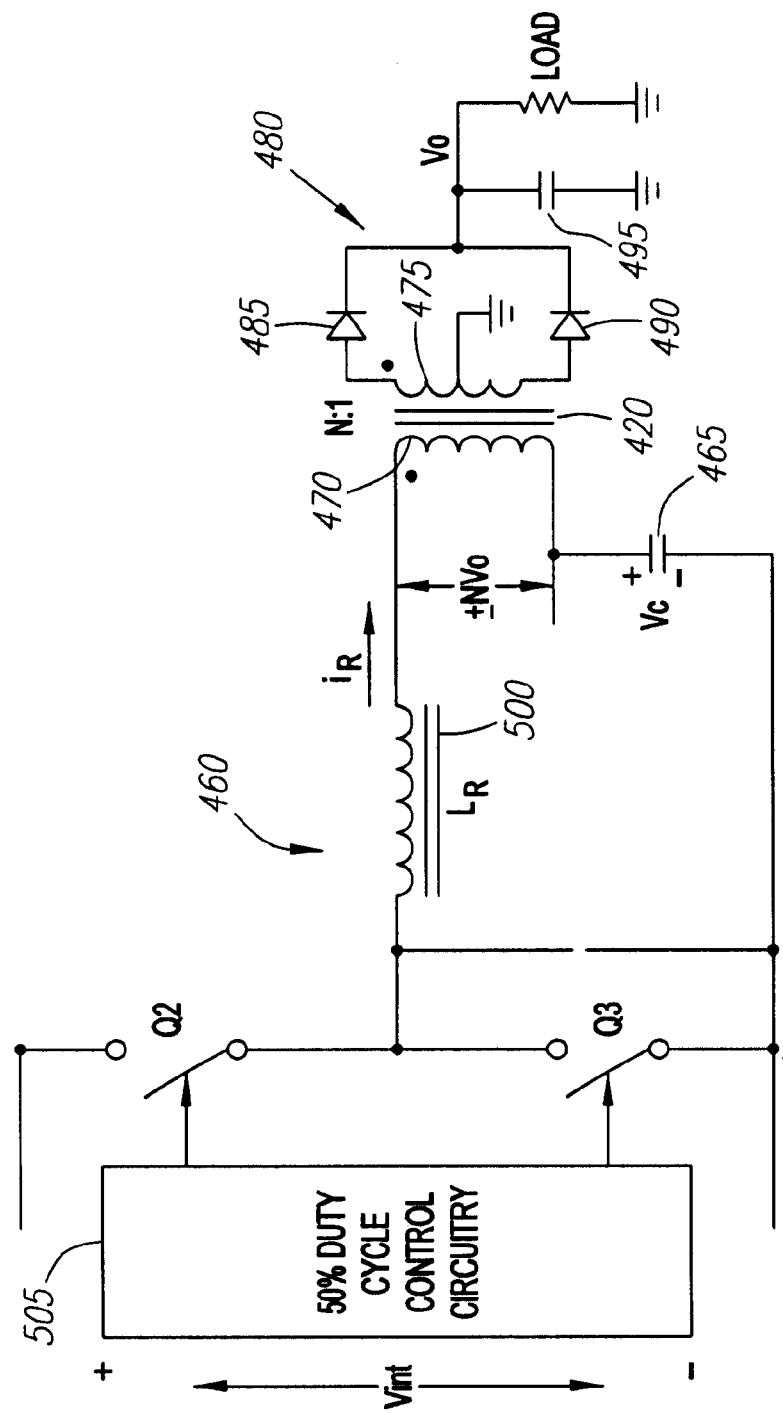
FIG. 12 illustrates a series resonant tank for the power converter of FIG. 10.

A full-wave resonant transition converter, referred to herein as an alternating current tank, possesses desirable low noise and loss properties for use as the DC/AC switching power converter 410. Referring now to FIG. 12, an alternating current tank 460 couples to $V_{int}$ to generate an output voltage that is isolated from $V_{in}$. The alternating current tank 460 includes a storage capacitor 465 that is either in series or in parallel with the primary winding 470 of the transformer 420. A first and a second switch (illustrated here as switches Q2 and Q3, respectively) couple to the primary winding 470 and storage capacitor 465. As explained herein, the alternating current tank 460 generates an alternating current through the primary winding 470 by switching switches Q2 and Q3 ON and OFF at a constant duty cycle. The preferred constant duty cycle is a 50% duty cycle and this will be the duty cycle used in the remaining discussion. That is not to imply, however, that a different constant duty cycle would be unsuitable. The alternating current (AC) thus induced through the secondary winding 475 may be rectified or used as AC. In the embodiment of the alternating current tank 460 illustrated in FIG. 12, a rectifier 480 on the secondary side of the transformer 420 rectifies the current through the load. The rectifier 480 may be either a full-wave or half-wave rectifier as is known in the art. In one embodiment, the rectifier 480 comprises a center tapped secondary winding 475 coupled to diodes 485 and 490 and output capacitor 495 to form a full wave rectifier such that current is unidirectional through the load.

As described herein, the alternating current tank 21 may be in either a series resonant tank or a parallel resonant tank configuration. Such configurations have the storage capacitor 465 and the primary winding 470 in series or parallel, respectively, as described above. However, in such configurations, the value of a capacitance of the storage capacitor 465, a leakage inductance 500 of the primary winding 470, and the period of the 50% duty cycle used to operate switches Q2 and Q3 are such that resonant waveforms are generated. Because these configurations permit zero-transition switching of switches Q2 and Q3, which reduces stress and loss, they will be described with respect to the series and parallel embodiments of the alternating current tanks described herein. That is not to imply, however, that a non-resonant DC/AC switching power converter 410 is not suitable for the pre-regulated power converter 400.

The operation of the alternating current tank 460 of FIG. 12 in a series resonant tank configuration occurs as follows. Control circuit 505 drives a first resonant switch Q2 and a second resonant switch Q3 such that when Q2 is ON, Q3 is OFF. Conversely, control circuit 505 drives Q2 OFF when Q3 is ON. When Q2 is on, the internal output voltage is coupled to the series-connected storage capacitor 465 and primary winding 470, thereby charging the storage capacitor 465 and inducing a half-wave quasi-sinusoidal current in a first direction through the primary winding 470 and the resonant tank circuit formed by the storage capacitor 465 and the leakage inductance 500 of the primary winding (represented separately from the primary winding for illustration purposes). Conversely, when Q3 is on, series-connected storage capacitor 465 and the primary winding 470 are uncoupled from the internal voltage output such that the charged storage capacitor 465 discharges and a half-wave quasi-sinusoidal current is induced in a second direction, opposite to that of the first direction, through the primary winding 470 and the resonant tank circuit formed by the storage capacitor 465 and the linkage inductance 500.

Figure 13:
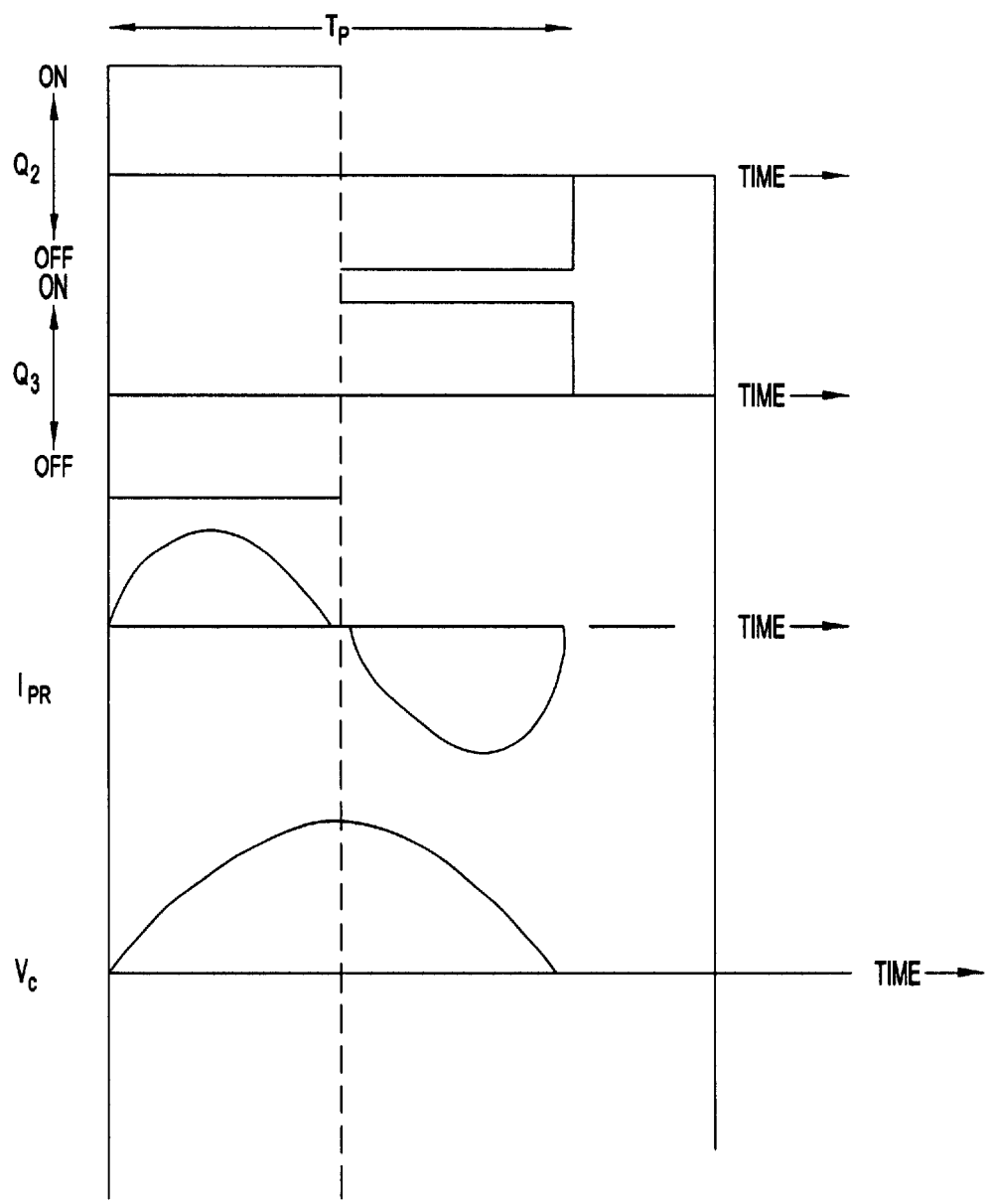
FIG. 13 is a graphical representation of the switch signals and the quasi-sinusoidal resonant currents for the series resonant tank of FIG. 12

The control circuit 505 operates the resonant switches Q2 and Q3 at substantially a 50% duty cycle such that the ON time equals the OFF time of each resonant switch. Referring now to FIG. 13, the relationship between the ON and OFF times of Q2 and Q3, the full-wave quasi-sinusoidal current induced in the primary winding 470, $I_{PR}$, and the voltage, Vc, across the storage capacitor 465 is illustrated. As can be seen from inspection of FIG. 13, the resonant switches Q2 and Q3 are turned ON and OFF when the current $I_{PR}$ is zero, hence the denotation of a "zero-current" resonant converter. In this fashion, switching losses are minimized. Moreover, because the ON and OFF times of each resonant switch are equal, the primary winding 470 is effectively excited by a full-wave sinusoidal current. During the time Q2 is ON, the voltage, Vc, across the storage capacitor 465 charges to a maximum value. During the time Q3 is ON, the voltage $V_c$ discharges to zero. Note that there will be ordinarily some dead time (not illustrated) wherein Q2 has turned OFF but Q3 has not yet turned ON. In addition, the resonant frequency of the series resonant tank formed by the storage capacitor and the leakage inductance of the primary winding must be chosen such that the half-wave sinusoidal current waveform can be completed during the time when the resonant switches are ON. Thus, the current $I_{PR}$ is not a true full-wave sinusoid but rather a full-wave quasi-sinusoid. Nevertheless, the departure of $I_{PR}$ from a true sinusoidal wave may be minimal.

The period $T_p$ of the 50% duty cycle for each of the switches Q2 and Q3 is controlled by the control circuit 505. The period $T_p$ determined by the control circuit must be related to the period of the quasi-sinusoidal resonant current.

As can be seen from inspection of FIG. 13, $T_p$ must be greater than the period of the quasi-sinusoidal resonant current ($I_{PR}$) of the series resonant tank circuit formed by the linkage inductance 500 and the storage capacitor 465 so that each half cycle of the resonant current may finish during the ON time of its corresponding switch Q2 or Q3. For example, during the time Q2 is ON, $I_{PR}$ must cycle from zero, through a maximum, and back to zero again. If the resonant frequency $f_r$ of the tank circuit was too slow, the quasi-sinusoidal resonant current $I_{PR}$ would not be able to finish a half cycle during this time.

Consider the following example. If $T_p$ is set at 20 µs, then each half period (i.e., the time Q2 or Q3 is ON) is 10 µs. Thus, to assure completion of a half wave of the resonant current $I_{PR}$, the resonant half period should be less than this time, for example 8 µs. Such a half period gives a resonant frequency $f_r$ of 55.6 KHZ. For a series (and also a parallel) resonant tank circuit, the resonant frequency (in Hz) is given by $$f_r = 1/(2\pi * sqrt(L_R C_R))$$

where $L_R$ is the value of the leakage inductance and $C_R$ is the value of the resonant capacitance. Inspection of this equation indicates that to increase the resonant frequency $f_r$, the value of the (in this case, resonant) storage capacitor $C_R$ should be minimized. This leads to a design choice, because the output power of the primary winding 470 may be approximated as $$P_{primary} = (C_R * V^2 * f_r)/2$$

where V is the voltage across the primary winding 470 and $P_{primary}$ is the output power of the primary winding 470. Note that the contribution to $P_{primary}$ from the leakage inductance may be neglected due because the leakage inductance is typically quite small compared to the mutual inductance of the primary winding. Thus, if the mutual inductance is a few milliH, the leakage inductance will be a few µH.

Inspection of the equation for $P_{primary}$ reveals that the output power is increased if the value of the resonant storage capacitor $C_R$ is increased. However, if the value of $C_R$ is increased too much, then $f_r$ will be too slow to allow the resonant current to complete a half cycle during the times when either Q2 or Q3 is ON. Thus, tradeoffs should be made between the switching period $T_p$, the resonant (storage) capacitance and the desired output power.

Figure 14A:
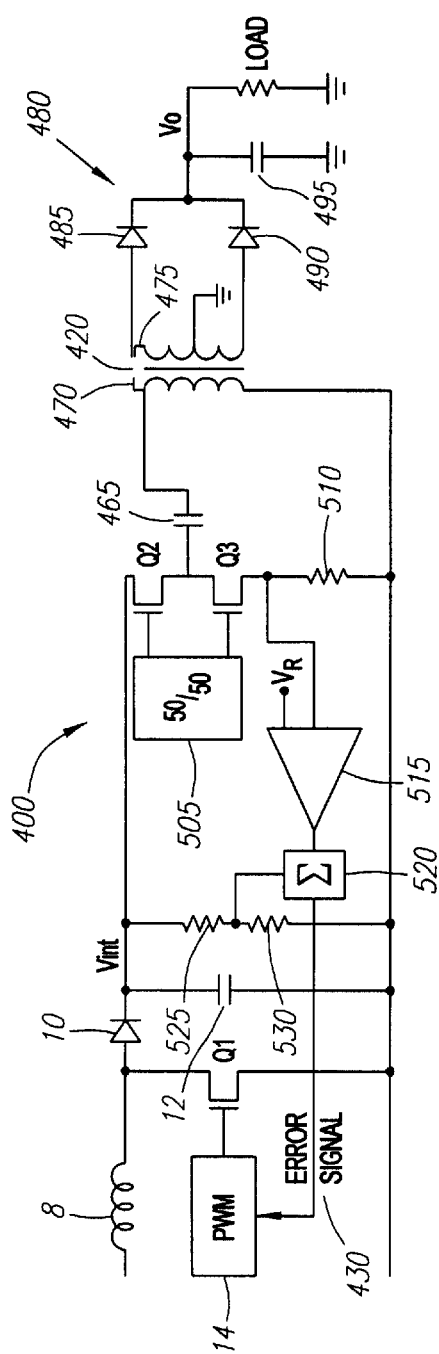
FIG. 14a is a schematic diagram of an embodiment of the pre-regulated power converter of FIG. 10.

An embodiment of the pre-regulated power converter 400 wherein the DC/DC converter 405 is a boost power converter and the DC/AC switching power converter 410 is in a series resonant tank configuration may be implemented as shown in FIG. 14a. In this embodiment, the boost power converter has the basic boost topology as described with respect to FIG. 1. However, the PWM modulator 14 is responsive to the uniquely derived error signal 430 to regulate the internal voltage output, $V_{int}$. This error signal 430 is derived in such a way as to provide load compensation. Load compensation accounts for the voltage losses at the load. To provide load compensation, the pre-regulated power converter 400 uses a feedback signal proportional to the voltage losses at the load, denoted as I^2 feedback 445 in FIG. 11. The generation of this feedback signal (shown symbolically in estimator 450 in FIG. 1b) will now be discussed. Note that, a priori, a user of the pre-regulated power converter 400 can estimate what the maximum current ($I_{MAX}$) through the load will be as well as the equivalent series resistance (ESR) as "seen" by the primary winding 470. Thus, by Ohm's law, the maximum voltage drop across this equivalent series resistance will be $I_{MAX}*ESR$. The pre-regulated power converter 400 uses this maximum voltage drop in a novel load compensation technique. This load compensation technique exploits the linearity of the transformer maintained by the constant duty cycle alternating current through the primary winding. Because of this linearity, the output voltage across the load is proportional to the current through the primary winding, $I_{PR}$. Thus, to provide load compensation, the pre-regulated power converter 400 compares the output voltage, $V_o$, which is reflected in the primary current, $I_{PR}$, to the maximum voltage losses expected, which is equal to $I_{MAX}*ESR$.

This comparison may be done in the following fashion. The current through the primary winding, $I_{PR}$, is sensed through a sense resistor 510 and the resulting voltage input to a differential amplifier 515. The differential amplifier 515 outputs a difference signal proportional to the difference between the voltage on the sense resistor and a reference voltage, $V_R$, proportional to the maximum expected voltage loss at the load. The value of the sense resistor and the proportionality are chosen such that the voltage across the sense resistor 515 and $V_R$ are equal when the current through the load is a maximum (when maximum voltage losses $I_{MAX}*ESR$ are occurring). At such a point the difference signal from the differential amplifier is at a minimum. This minimum signal is reflected in the error signal input to the pulse-width modulator 14 of the boost converter. To account for input line voltage fluctuations affecting the "preregulated" voltage, $V_{int}$, the difference signal from the differential amplifier is summed in a summer 520 with a voltage signal derived from the "preregulated" voltage, $V_{int}$, to produce the error signal 430. Note that this voltage signal could also have a separate path to the pulse width modulator 14. What is important is that the pulse width modulator 14 is responsive to changes in both the preregulated voltage, $V_{int}$, and the difference signal. As illustrated in FIG. 14a, the changes in the preregulated voltage, $V_{int}$, are sensed through a voltage divider formed by resistors 525 and 530.

The load compensation provided by the pre-regulated power converter 400 is further illustrated by the following discussion. It may be shown that the voltage output of the full wave rectifier 480 of FIG. 14a, $V_O$, which is the output voltage across the load, is approximated by $$V_O = V_{int}/2N$$

where N is the turn ratio between the primary winding 470 and the secondary winding 475. It follows from the load compensation described herein that the resonant current through the primary, $I_{PR}$, may be approximated by $$I_{PR} = (V - NV_o - (I_O*ESR/N))/Z_O; \ Z_O = sqrt(L_R/C_R)$$

where V is the voltage impressed across the series-connected resonant tank circuit formed by the storage capacitor 465 ($C_R$) and leakage inductance 500 ($L_R$) of the primary winding 470, $I_O$ is the current through the load, ESR is the equivalent series resistance seen by the primary winding 470, and $Z_O$ is the impedance of the resonant tank circuit formed by the leakage impedance 500 ($L_R$) and the storage capacitor 465 ($C_R$). Thus, $I_{PR}$ will have a value that is also linearly related to $V_{int}$. This demonstrates one of the advantages of the pre-regulated power converter 400—i.e., no external feedback is necessary from the secondary side 475 of the transformer 420. Instead, a single internal (primary side) feedback loop may be utilized because the peak values of $I_{PR}$ are linearly related to the output voltage. Thus, the often-onerous task of compensating feedback from the secondary side of the transformer may be eliminated.

In the embodiment of the pre-regulated power converter 400 illustrated in FIG. 14a, the current through the primary winding, $I_{PR}$, is sensed by coupling the voltage across the sense resistor 510 to an error amplifier 515. The switches Q1, Q2, and Q3 are implemented through semiconductor FET transistors. Note that in an alternate embodiment, the sense resistor 510 could have been placed in series with the primary winding 470, such that $I_{PR}$ could be sensed in each half cycle of the quasi-sinusoidal current flowing through the primary winding 470. In such an embodiment, however, the sensed voltage would be bipolar, alternating in polarity with each half cycle. To use a conventional differential amplifier 515 with this bipolar signal would require rectification. Thus, it is preferred to sense $I_{PR}$ only in the half cycle when switch Q3 is ON by placing the sense resistor in series with switch Q3.

Notably, both voltage and current feedback are used in the internal feedback loop of FIG. 14a: current feedback provided by sensing $I_{PR}$, and voltage feedback provided by sensing $V_{int}$. Such an arrangement provides an advantageous degree of control over the output voltage $V_O$.

As can be seen from the equation for the primary current, $I_{PR}$, given herein, the effects of load losses are reflected in the value of $I_{PR}$ through the $(I_O * ESR/N)$ term. Thus, sensing the primary current and adjusting the PWM accordingly does provide load compensation. In the circuit of FIG. 14a, load compensation will not substantially dominate the error signal unless the voltage across the sense resistor 510 rises to a level relatively close to $V_R$. Prior to this point, the internal voltage output, $V_{int}$, is largely controlled by the error signal provided through the voltage divider formed by resistors 525 and 530. When $I_{PR}$ rises such that $V_R$ is approached across the sensing resistor 510, the differential amplifier 515 will produce a minimum signal. This minimum signal will dominate over that produced by the voltage divider such that the PWM modulator 14 is adjusted largely by just the current feedback.

Moreover, the pre-regulated power converter 400 does not exclude the use of an external feedback loop coupled through the use of optoisolators, or other isolation means, as implemented in conventional flyback converters and the like. Indeed, an embodiment of the pre-regulated power converter 400 may have solely an external feedback loop as is known in the art and still possess advantageous properties because of the efficiencies inherent when an alternating current tank couples to a PWM switched converter. Regardless of the type of feedback, the characteristics of the resonant tank circuit within the alternating current tank 460 remains constant: no adjustment in the switching speed of Q2 and Q3 need be made. Thus, unlike prior art resonant converters, power factor correction and regulation of the alternating current tank 460 is controlled through adjusting the PWM of the power converter 405, not by internal adjustments of the resonant tank.

Figure 14B:
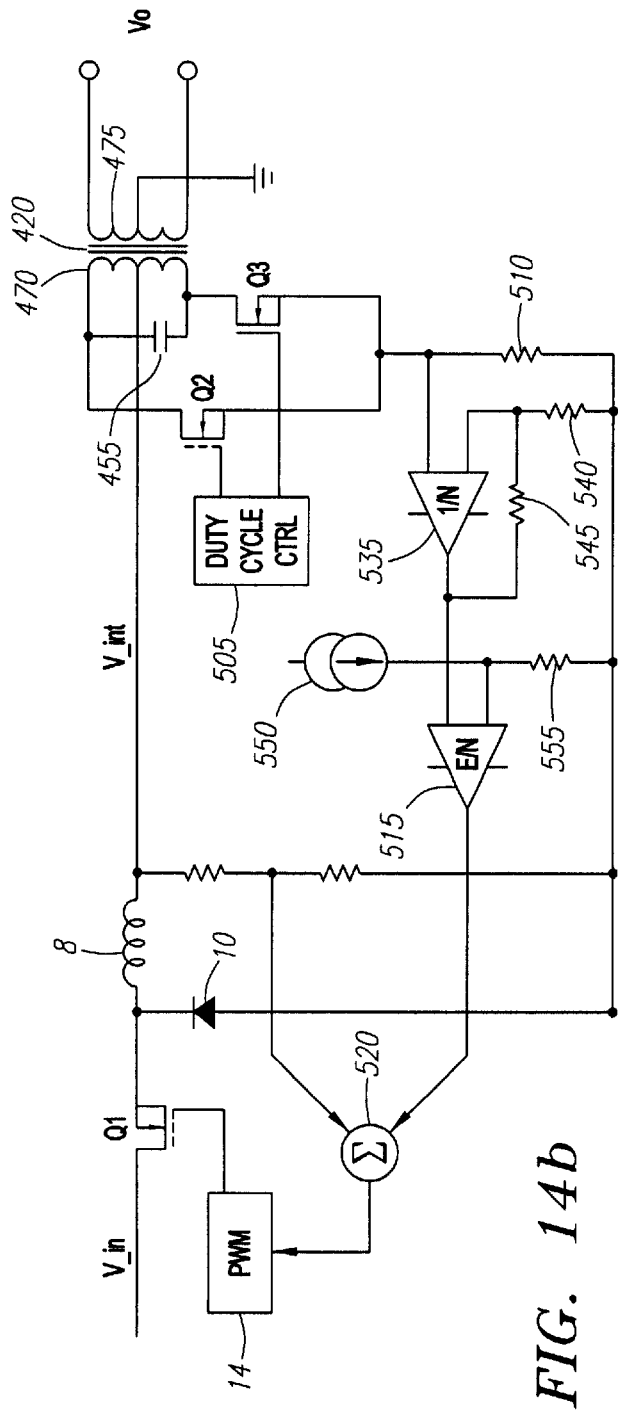
FIG. 14*b* illustrates further details of a load compensation feedback path for the embodiment of FIG. 14*a*.

The load compensation feedback provided by the differential amplifier 515 may be further implemented as illustrated in FIG. 14b. Rather than just couple an input of the differential amplifier 515 to the voltage across the sense resistor 510, this voltage may first be amplified by amplifier 535. As illustrated, amplifier 535 is in the non-inverting configuration whose gain is determined by resistors 540 and 545. Those of ordinary skill will appreciate that other amplifier configurations may be used. The resulting amplified voltage is coupled as an input to the differential amplifier 515. A constant current source 550 coupled to a resistor 555 provides the reference voltage $V_R$.

The error signal 430 just described may be modified for use in embodiments of the invention. Consider the following modification of the pre-regulated power converter 400 of FIG. 14a into the power converter 600 illustrated in FIG. 15. Unlike the pre-regulated power converter 400, no DC/DC power converter 405 (the boost power supply in FIG. 14a) is needed to generate a pre-regulated voltage, $V_{int}$. Instead an unregulated DC input voltage provides the power for the alternating current tank 460. The error amplifier 515 provides a difference signal as described with respect to FIG. 14a. Thus, modulation of the alternating current tank 460 responsive to this difference signal will provide load compensation, eliminating the need for feedback from the secondary side of the transformer 420. Note that the operation of the 50% duty cycle control circuit 505 of FIG. 14a is obtained in the following manner. A free-running oscillator 205 freely oscillates as described with respect to the embodiments of the invention illustrated in FIGS. 2 through 8b. Similarly, the free-running oscillator is coupled to an oscillator gate 220 controlled by a gate signal produced by the controller 210. Within the oscillator gate 220, a pair of exclusive OR (XOR) gates 605 and 610 produce the alternating drive signals necessary to switch power switch Q2 ON when power switch Q3 is OFF and to switch power switch Q2 OFF when power switch Q3 is ON. If the free-running oscillator 205 produces a square wave drive signal, the power switches Q2 and Q3 will each have a 50% duty cycle. A pair of AND gates 615 and 620 will block the alternating drive signals in response to a gate signal. A pulse width modulator 240, within fixed control frames defined by timing pulses produced by the framing generator 235, modulates the gate signal according to the difference signal produced by the differential amplifier 515. Thus, when the gating signal is high, the free-running oscillator 205 will, through operation of the XOR gates 605 and 610, produce the necessary alternating drive signals to Q2 and Q3. In turn, a pulse train of alternating current will flow through the primary winding 470 and secondary winding 475 to produce pulses of power at the load. Because the oscillation frequency is not regulated, these pulses of power are also unregulated, the regulation being provided by the gating of the pulse train coming from the pulse width modulator 240.

Figure 15:
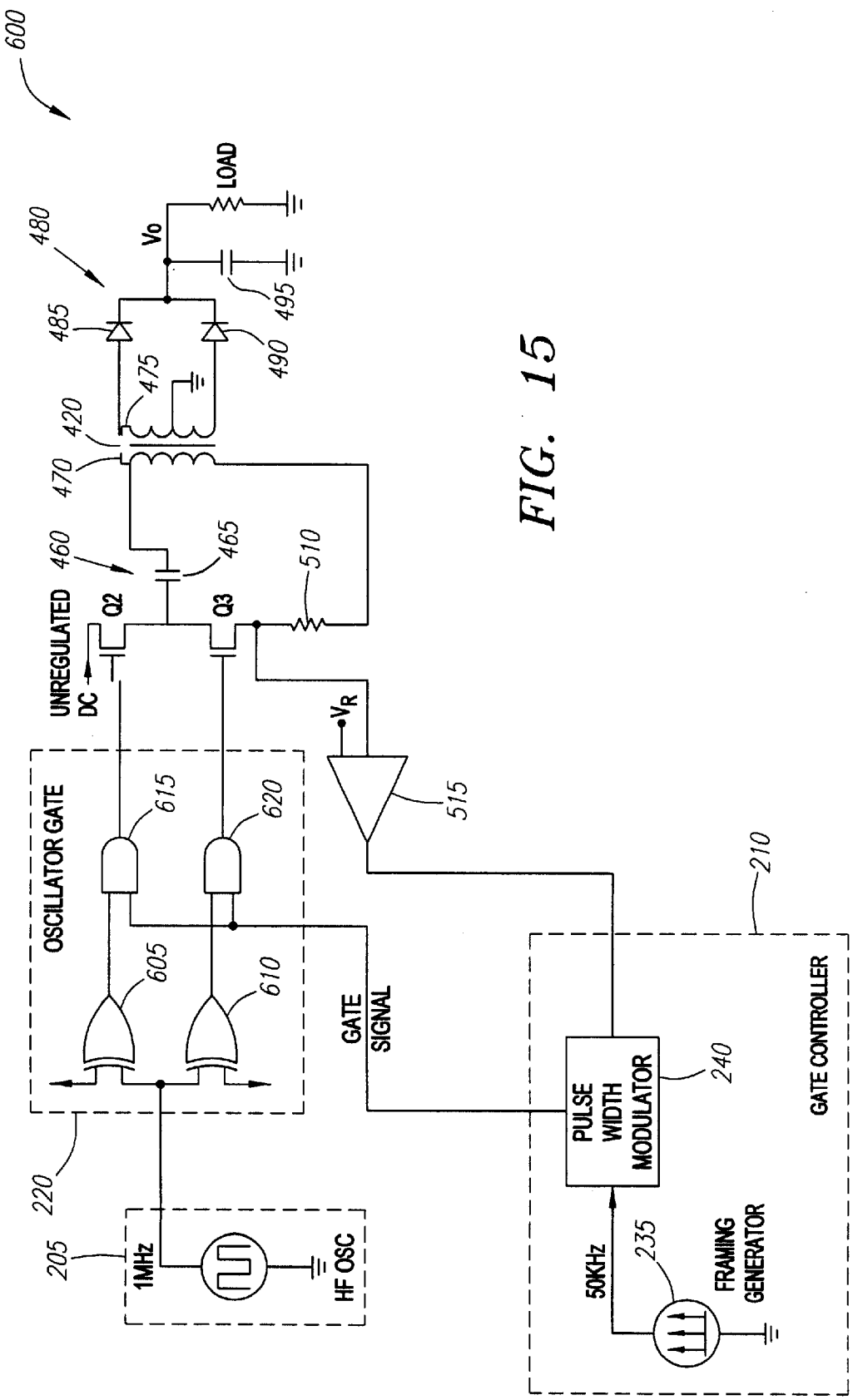
FIG. 15 is a gated series resonant tank according to one embodiment of the invention.

It will be appreciated that the embodiment of the invention illustrated in FIG. 15 is easily modified. For example, other means of controlling the switch control combination 215 as discussed with respect to FIGS. 3a and 3d could be implemented. Also, the alternating current tank could be in parallel rather than series configuration. In addition, the alternating current tank could be a single-ended tank having just one power switch rather than a pair of switches as in FIG. 15. What is important is that the principles of the invention as discussed with respect to FIGS. 2 through 8b may be applied to an alternating current tank having load compensation as discussed herein.

Specific examples of the present invention have been shown by way of example in the drawings and are herein described in detail. It is to be understood, however, that the invention is not to be limited to the particular forms or methods disclosed, but to the contrary, the invention is to broadly cover all modifications, equivalents, and alternatives encompassed by the scope of the appended claims.

What is claimed is:

1. A switching power converter for conversion of power between a source and a load, comprising:
   a power switch;
   a free running oscillator for producing a drive signal to cycle the power switch ON and OFF, wherein the power switch, when coupled to the source and cycled ON and OFF, defines a pulse of power at the load; and a controller, wherein the controller regulates an output voltage at the load by varying the number of pulses of power occurring at the load over time.

2. The switching power converter of claim 1, wherein the controller varies the number of pulses of power appearing at the load over time by controlling whether a given cycle of the drive signal produces a pulse of power at the load.

3. The switching power converter of claim 1, wherein the controller regulates the output voltage by varying the number of pulses of power occurring at the load within a fixed control frame period.

4. The switching power converter of claim 3, wherein the controller comprises a pulse-width modulator, the pulse-width modulator modulating a duration of a gating period within the fixed control frame period such that no pulses of power occur at the load during the gating period, and such that pulses of power occur at the load during the remainder of the fixed control frame period.

5. The switching power converter of claim 4, wherein the oscillator has an ON state during which the oscillator produces the drive signal and an OFF state during which the power switch is OFF, the controller switching the oscillator into the OFF state during the gating period and into the ON state in the remainder of the fixed control frame period as determined by the pulse width modulator.

6. The switching power converter of claim 5, further comprising:
  a capacitor coupled to the power switch and to a primary winding of a transformer to form an alternating current tank; and
  an error amplifier having an input coupled to a current sensor, the current sensor sensing a voltage proportional to a current through the primary winding, the error amplifier having another input coupled to a reference voltage proportional to a maximum expected voltage loss on the load, the error amplifier producing a control signal proportional to the difference between the reference voltage and the voltage sensed by the current sensor;
  wherein the pulse width modulator is responsive to the control signal.

7. The switching power converter of claim 6, wherein the alternating current tank is a series resonant tank.

8. The switching power converter of claim 6, wherein the alternating current tank is a parallel resonant tank.

9. The switching power converter of claim 3, wherein the controller determines cycles of the drive signal during which none of the pulses of power occur at the load, the determined cycles being aperiodic to a frame control rate defined by the fixed control frame period.

10. The switching power converter of claim 3, wherein the controller determines cycles of the drive signal during which none of the pulses of power occur at the load, the determined cycles being evenly spread within the fixed control frame period.

11. The switching power converter of claim 1, wherein the controller regulates the output voltage by varying the number of pulses of power appearing at the load within a variable control frame period.

12. The switching power converter of claim 11, wherein the oscillator has an ON state during which the oscillator produces the drive signal and an OFF state during which the power switch is OFF, the controller switching the oscillator into the ON state in a fixed period within the variable control frame period.

13. The switching power converter of claim 11, wherein the oscillator has an ON state during which the oscillator produces the drive signal and an OFF state during which the power switch is OFF, the controller switching the oscillator into the OFF state during a fixed period within the variable control frame period.

14. The switching power converter of claim 1, further comprising an oscillator gate coupled between the oscillator and the power switch, the oscillator gate responsive to a gate signal produced by the pulse width modulator for blocking the drive signal, the gate signal having a high state in which the oscillator gate blocks the drive signal and a low state in which the oscillator gate does not block the drive signal, the controller switching the drive signal into the high state during the gating period and into the low state during the remainder of the fixed control frame period.

15. The switching power converter of claim 1, further comprising a blocking switch coupled in series with the source, the controller switching the blocking switch OFF during the gating period and switching the blocking switch ON during the remainder of the fixed control period.

16. A method of converting power, comprising:
  (a) providing a DC input voltage to a switching power converter, the switching power converter having an a power switch and a free running oscillator for producing a drive the power switch ON and OFF, wherein the power switch, when coupled to the DC input voltage and cycled ON and OFF, defines a pulse of power at a load;
  (b) cycling the drive signal for a period of time wherein pulses of power occur at the load; and
  (c) controlling whether the drive signal cycles from step (b) produce pulses of power at the load to regulate an output voltage at the output.

17. The method of claim 16, wherein the period of time is fixed.

18. The method of claim 17, wherein the period of time is variable.

* * * * *